US009313156B2

(12) United States Patent
Collins et al.

(10) Patent No.: US 9,313,156 B2
(45) Date of Patent: *Apr. 12, 2016

(54) ELECTRONIC MESSAGE SEND DEVICE HANDLING SYSTEM AND METHOD WITH SEPARATED DISPLAY AND TRANSMISSION OF MESSAGE CONTENT AND HEADER INFORMATION

(71) Applicant: Vaporstream, Inc., Chicago, IL (US)

(72) Inventors: Joseph Collins, Chicago, IL (US); Amit Jindas Shah, Chicago, IL (US)

(73) Assignee: VAPORSTREAM, INC., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/572,932

(22) Filed: Dec. 17, 2014

(65) Prior Publication Data

US 2015/0100657 A1 Apr. 9, 2015

Related U.S. Application Data

(63) Continuation of application No. 14/133,875, filed on Dec. 19, 2013, now Pat. No. 8,935,351, which is a continuation of application No. 13/651,909, filed on Oct. 15, 2012, now abandoned, which is a continuation (Continued)

(51) Int. Cl.
*G06F 3/00* (2006.01)
*G06F 7/04* (2006.01)
(Continued)

(52) U.S. Cl.
CPC .............. *H04L 51/10* (2013.01); *G06F 3/0482* (2013.01); *G06F 3/04842* (2013.01);
(Continued)

(58) Field of Classification Search
CPC ....... H04L 63/04; H04L 51/063; H04L 51/18; H04L 51/22; H04L 51/10; H04L 51/34; H04L 63/0428; H04L 51/02; H04L 51/28; H04L 67/02; H04L 51/08; G06Q 10/00; G06Q 10/107; G06F 21/10; G06F 2221/0737; G06F 2221/2101; G06F 2221/2119; G06F 3/0482; G06F 3/04842
USPC .............................. 709/206; 715/752; 726/26
See application file for complete search history.

(56) References Cited

U.S. PATENT DOCUMENTS 4,803,703 A 2/1989 DeLuca et al.
5,255,356 A * 10/1993 Michelman ........... G06F 17/246
715/212

(Continued)

FOREIGN PATENT DOCUMENTS

DE 102004031677 A1 1/2006
EP 899918 A2 3/1999

(Continued)

OTHER PUBLICATIONS

U.S. Appl. No. 13/651,909, filed Jun. 8, 2015, Office Action.

(Continued)

*Primary Examiner* — Daniel C Murray
(74) *Attorney, Agent, or Firm* — Birch Tree IP Law & Strategy PLLC

(57) ABSTRACT

An electronic messaging system and method with reduced traceability. Message content and an identifier of a recipient are associated with an electronic message at a sending user device. The message content is associated via a first display and the identifier of a recipient is associated via a second display. The first and second displays are not displayed at the same time. The identifier of the recipient is part of header information for the electronic message and the header information is not displayed at the same time as a media component of the message content via the first display. Transmission of recipient identifier and message content including a media component occurs separately from the sending user device. Methods, systems, and computer readable media with separation of the display of media component and recipient identifier in various implementations may provide for reduced traceability of an electronic message.

33 Claims, 10 Drawing Sheets

Related U.S. Application Data of application No. 12/605,885, filed on Oct. 26, 2009, now Pat. No. 8,291,026, which is a continuation of application No. 11/401,148, filed on Apr. 10, 2006, now Pat. No. 7,610,345.

(60) Provisional application No. 60/703,367, filed on Jul. 28, 2005.

(51) Int. Cl.

| | | |
|---|---|---|
| *G06F 15/16* | (2006.01) | |
| *H04L 12/58* | (2006.01) | |
| *H04L 29/06* | (2006.01) | |
| *H04L 29/08* | (2006.01) | |
| *G06F 21/10* | (2013.01) | |
| *G06Q 10/00* | (2012.01) | |
| *G06Q 10/10* | (2012.01) | |
| *G06F 3/0482* | (2013.01) | |
| *G06F 3/0484* | (2013.01) | |

(52) U.S. Cl.
CPC ............... *G06F 21/10* (2013.01); *G06Q 10/00* (2013.01); *G06Q 10/107* (2013.01); *H04L 51/02* (2013.01); *H04L 51/063* (2013.01); *H04L 51/08* (2013.01); *H04L 51/18* (2013.01); *H04L 51/22* (2013.01); *H04L 51/34* (2013.01); *H04L 63/04* (2013.01); *H04L 63/0428* (2013.01); *H04L 67/02* (2013.01); *G06F 2221/0737* (2013.01); *G06F 2221/2101* (2013.01); *G06F 2221/2119* (2013.01); *H04L 51/28* (2013.01)

(56) References Cited

U.S. PATENT DOCUMENTS

| | | | |
|---|---|---|---|
| 5,457,454 | A | 10/1995 | Sugano |
| 5,560,033 | A | 9/1996 | Doherty et al. |
| 5,598,279 | A | 1/1997 | Ishii et al. |
| 5,608,786 | A | 3/1997 | Gordon |
| 5,675,507 | A * | 10/1997 | Bobo, II .................. H04L 29/06 348/14.12 |
| 5,680,551 | A | 10/1997 | Martino, II |
| 5,742,905 | A | 4/1998 | Pepe |
| 5,754,778 | A | 5/1998 | Shoujima |
| 5,768,503 | A | 6/1998 | Olkin |
| 5,781,741 | A | 7/1998 | Imamura et al. |
| 5,848,410 | A | 12/1998 | Walls et al. |
| 5,857,201 | A | 1/1999 | Wright, Jr. |
| 5,870,605 | A | 2/1999 | Bracho |
| 5,874,960 | A | 2/1999 | Mairs et al. |
| 5,889,942 | A | 3/1999 | Orenshteyn |
| 5,896,301 | A | 4/1999 | Barrientos |
| 5,903,472 | A | 5/1999 | Barrientos |
| 5,930,479 | A | 7/1999 | Hall |
| 5,949,348 | A | 9/1999 | Kapp et al. |
| 5,951,636 | A | 9/1999 | Zerber |
| 5,956,521 | A | 9/1999 | Wang |
| 5,958,005 | A * | 9/1999 | Thorne .................. G06Q 10/107 380/51 |
| 6,006,206 | A | 12/1999 | Smith et al. |
| 6,008,807 | A | 12/1999 | Bretschneider et al. |
| 6,018,801 | A | 1/2000 | Palage et al. |
| 6,038,601 | A | 3/2000 | Lambert et al. |
| 6,044,395 | A | 3/2000 | Costales et al. |
| 6,071,347 | A | 6/2000 | Ogawa et al. |
| 6,073,174 | A | 6/2000 | Montgomerie |
| 6,076,101 | A | 6/2000 | Kamakura et al. |
| 6,134,432 | A | 10/2000 | Holmes et al. |
| 6,161,129 | A | 12/2000 | Rochkind |
| 6,178,331 | B1 | 1/2001 | Holmes et al. |
| 6,209,100 | B1 | 3/2001 | Robertson et al. |
| 6,233,318 | B1 | 5/2001 | Picard et al. |
| 6,268,855 | B1 | 7/2001 | Mairs et al. |
| 6,271,839 | B1 | 8/2001 | Mairs et al. |
| 6,285,363 | B1 | 9/2001 | Mairs et al. |
| 6,288,704 | B1 | 9/2001 | Flack et al. |
| 6,289,212 | B1 | 9/2001 | Stein et al. |
| 6,289,450 | B1 | 9/2001 | Pensak et al. |
| 6,298,446 | B1 | 10/2001 | Schreiber et al. |
| 6,324,569 | B1 | 11/2001 | Ogilvie et al. |
| 6,339,825 | B2 | 1/2002 | Pensak et al. |
| 6,353,892 | B2 | 3/2002 | Schreiber et al. |
| 6,357,010 | B1 | 3/2002 | Viets et al. |
| 6,370,656 | B1 | 4/2002 | Olarig et al. |
| 6,411,684 | B1 | 6/2002 | Cohn et al. |
| 6,434,702 | B1 | 8/2002 | Maddalozzo, Jr. et al. |
| 6,438,594 | B1 | 8/2002 | Bowman-Amuah |
| 6,442,592 | B1 | 8/2002 | Alumbaugh |
| 6,449,721 | B1 | 9/2002 | Pensak et al. |
| 6,487,586 | B2 | 11/2002 | Ogilvie et al. |
| 6,516,416 | B2 | 2/2003 | Gregg et al. |
| 6,529,500 | B1 | 3/2003 | Pandharipande |
| 6,549,194 | B1 | 4/2003 | McIntyre et al. |
| 6,556,586 | B1 | 4/2003 | Sipila |
| 6,563,800 | B1 | 5/2003 | Salo |
| 6,591,291 | B1 | 7/2003 | Gabber et al. |
| 6,601,088 | B1 | 7/2003 | Kelley et al. |
| 6,606,659 | B1 | 8/2003 | Hegli et al. |
| 6,609,148 | B1 | 8/2003 | Salo |
| 6,629,138 | B1 | 9/2003 | Lambert et al. |
| 6,631,398 | B1 | 10/2003 | Klein |
| 6,651,185 | B1 | 11/2003 | Sauvage |
| 6,671,732 | B1 | 12/2003 | Weiner |
| 6,697,806 | B1 | 2/2004 | Cook |
| 6,701,346 | B1 | 3/2004 | Klein |
| 6,701,347 | B1 * | 3/2004 | Ogilvie ................ G06Q 10/107 709/202 |
| 6,711,608 | B1 | 3/2004 | Ogilvie |
| 6,721,784 | B1 | 4/2004 | Leonard et al. |
| 6,724,370 | B2 | 4/2004 | Dutta et al. |
| 6,728,714 | B1 | 4/2004 | Doganata et al. |
| 6,730,863 | B1 | 5/2004 | Gerpheide et al. |
| 6,732,150 | B1 | 5/2004 | Thrane |
| 6,732,368 | B1 | 5/2004 | Michael |
| 6,741,855 | B1 | 5/2004 | Martin et al. |
| 6,742,032 | B1 | 5/2004 | Castellani et al. |
| 6,748,422 | B2 | 6/2004 | Morin et al. |
| 6,757,713 | B1 | 6/2004 | Ogilvie et al. |
| 6,779,022 | B1 | 8/2004 | Horstmann |
| 6,804,675 | B1 | 10/2004 | Knight et al. |
| 6,826,688 | B1 | 11/2004 | Westerman et al. |
| 6,829,599 | B2 | 12/2004 | Chidlovskii |
| 6,829,631 | B1 | 12/2004 | Forman et al. |
| 6,832,354 | B2 | 12/2004 | Kawano et al. |
| 6,834,372 | B1 | 12/2004 | Becker et al. |
| 6,851,049 | B1 | 2/2005 | Price, III |
| 6,922,693 | B1 | 7/2005 | Rubin et al. |
| 6,978,376 | B2 | 12/2005 | Giroux et al. |
| 6,993,662 | B2 | 1/2006 | Rubin et al. |
| 7,010,566 | B1 | 3/2006 | Jones et al. |
| 7,020,783 | B2 | 3/2006 | Vange et al. |
| 7,035,912 | B2 | 4/2006 | Arteaga |
| 7,043,563 | B2 | 5/2006 | Vange et al. |
| 7,062,454 | B1 | 6/2006 | Giannini et al. |
| 7,062,533 | B2 | 6/2006 | Brown et al. |
| 7,062,563 | B1 | 6/2006 | Lewis |
| 7,072,934 | B2 | 7/2006 | Helgeson |
| 7,076,085 | B1 | 7/2006 | Sah |
| 7,076,469 | B2 | 7/2006 | Schreiber et al. |
| 7,080,077 | B2 | 7/2006 | Ramamurthy |
| 7,111,006 | B2 | 9/2006 | Vange et al. |
| 7,120,615 | B2 | 10/2006 | Sullivan et al. |
| 7,120,662 | B2 | 10/2006 | Vange et al. |
| 7,123,609 | B2 | 10/2006 | Glasser et al. |
| 7,124,189 | B2 | 10/2006 | Summers |
| 7,127,518 | B2 | 10/2006 | Vange et al. |
| 7,130,831 | B2 | 10/2006 | Howard et al. |
| 7,143,195 | B2 | 11/2006 | Vange et al. |
| 7,155,539 | B2 | 12/2006 | Vange et al. |
| 7,155,743 | B2 | 12/2006 | Goodman et al. |
| 7,155,744 | B2 | 12/2006 | Schreiber et al. |

(56) References Cited

U.S. PATENT DOCUMENTS

| | | |
|---|---|---|
| 7,162,014 B2 | 1/2007 | Skladman |
| 7,162,471 B1 | 1/2007 | Knight et al. |
| 7,162,508 B2 | 1/2007 | Messina |
| 7,162,649 B1 | 1/2007 | Ide |
| 7,171,620 B2 | 1/2007 | Castellani et al. |
| 7,171,693 B2 | 1/2007 | Tucker et al. |
| 7,174,453 B2 | 2/2007 | Lu |
| 7,185,359 B2 | 2/2007 | Schmidt et al. |
| 7,185,364 B2 | 2/2007 | Knouse et al. |
| 7,191,219 B2 | 3/2007 | Udell et al. |
| 7,194,547 B2 | 3/2007 | Moreh |
| 7,194,764 B2 | 3/2007 | Martherus et al. |
| 7,200,635 B2 | 4/2007 | Yashchin et al. |
| 7,213,249 B2 | 5/2007 | Tung Loo |
| 7,219,148 B2 | 5/2007 | Rounthwaite et al. |
| 7,222,157 B1 | 5/2007 | Sutton, Jr. et al. |
| 7,266,779 B2 * | 9/2007 | Baek ............... H04L 63/10 709/229 |
| 7,281,272 B1 | 10/2007 | Rubin et al. |
| 7,305,069 B1 | 12/2007 | Day |
| 7,340,518 B1 | 3/2008 | Jenkins |
| 7,356,564 B2 | 4/2008 | Hartselle et al. |
| 7,366,760 B2 | 4/2008 | Warren et al. |
| 7,386,590 B2 | 6/2008 | Warren et al. |
| 7,433,949 B2 | 10/2008 | Xu et al. |
| 7,451,359 B1 | 11/2008 | Coekaerts |
| 7,496,631 B2 | 2/2009 | Austin-Lane et al. |
| 7,532,913 B2 | 5/2009 | Doulton |
| 7,539,755 B2 | 5/2009 | Li et al. |
| 7,562,118 B2 | 7/2009 | Fellenstein et al. |
| 7,590,693 B1 | 9/2009 | Chan et al. |
| 7,610,345 B2 | 10/2009 | Collins et al. |
| 7,620,688 B2 | 11/2009 | Warren et al. |
| 7,657,759 B2 | 2/2010 | Rubin et al. |
| 7,664,956 B2 | 2/2010 | Goodman |
| 7,676,767 B2 * | 3/2010 | Hofmeister ......... G06F 3/0483 345/173 |
| 7,730,150 B2 | 6/2010 | Warren et al. |
| 7,760,662 B2 | 7/2010 | Maeda |
| 7,765,285 B2 | 7/2010 | Yoshida et al. |
| 7,765,483 B2 * | 7/2010 | Schmieder ............ G06F 9/54 715/751 |
| 7,774,414 B2 | 8/2010 | Shah |
| 7,783,715 B2 | 8/2010 | Muller |
| 7,814,158 B2 | 10/2010 | Malik |
| 7,836,301 B2 | 11/2010 | Harris |
| 7,860,932 B2 | 12/2010 | Fried |
| 7,899,872 B2 | 3/2011 | Warren et al. |
| 7,962,654 B2 | 6/2011 | Vange et al. |
| 7,966,376 B2 | 6/2011 | Kelso et al. |
| 7,975,066 B2 | 7/2011 | Vange et al. |
| 8,171,286 B2 | 5/2012 | Harris |
| 8,200,971 B2 | 6/2012 | Edwards |
| 8,255,465 B2 | 8/2012 | Edwards |
| 8,291,026 B2 | 10/2012 | Collins et al. |
| 8,364,764 B2 | 1/2013 | Hartselle et al. |
| 8,386,641 B2 | 2/2013 | Vange et al. |
| 8,417,770 B2 | 4/2013 | Vange et al. |
| 8,463,935 B2 | 6/2013 | Vange et al. |
| 8,725,809 B2 | 5/2014 | Hartselle et al. |
| 8,886,739 B2 | 11/2014 | Collins et al. |
| 8,935,351 B2 | 1/2015 | Collins et al. |
| 9,054,870 B2 * | 6/2015 | Gassi ..................... H04L 9/28 |
| 9,076,231 B1 * | 7/2015 | Hill ..................... G06T 3/4023 |
| 9,147,050 B2 * | 9/2015 | Park ..................... G06F 21/10 |
| 9,154,926 B1 * | 10/2015 | Steele ..................... H04W 4/12 |
| 2001/0000265 A1 | 4/2001 | Schreiber et al. |
| 2001/0000359 A1 | 4/2001 | Schreiber et al. |
| 2001/0000541 A1 | 4/2001 | Schreiber et al. |
| 2001/0006551 A1 | 7/2001 | Masaki |
| 2001/0034791 A1 | 10/2001 | Clubb et al. |
| 2001/0037316 A1 | 11/2001 | Shiloh |
| 2001/0044831 A1 | 11/2001 | Yamazaki |
| 2002/0002602 A1 | 1/2002 | Vange et al. |
| 2002/0002603 A1 | 1/2002 | Vange |
| 2002/0002611 A1 | 1/2002 | Vange |
| 2002/0002618 A1 | 1/2002 | Vange |
| 2002/0002622 A1 | 1/2002 | Vange et al. |
| 2002/0002625 A1 | 1/2002 | Vange et al. |
| 2002/0002636 A1 | 1/2002 | Vange et al. |
| 2002/0002686 A1 | 1/2002 | Vange et al. |
| 2002/0002688 A1 | 1/2002 | Gregg et al. |
| 2002/0004796 A1 | 1/2002 | Vange et al. |
| 2002/0004816 A1 | 1/2002 | Vange et al. |
| 2002/0016918 A1 | 2/2002 | Tucker et al. |
| 2002/0019853 A1 | 2/2002 | Vange et al. |
| 2002/0023159 A1 | 2/2002 | Vange et al. |
| 2002/0024506 A1 | 2/2002 | Flack et al. |
| 2002/0026487 A1 | 2/2002 | Ogilvie et al. |
| 2002/0026495 A1 | 2/2002 | Arteaga |
| 2002/0029248 A1 | 3/2002 | Cook et al. |
| 2002/0029249 A1 | 3/2002 | Campbell et al. |
| 2002/0032742 A1 | 3/2002 | Anderson |
| 2002/0049749 A1 | 4/2002 | Helgeson et al. |
| 2002/0054120 A1 | 5/2002 | Kawano et al. |
| 2002/0056006 A1 | 5/2002 | Vange et al. |
| 2002/0059170 A1 | 5/2002 | Vange |
| 2002/0059381 A1 | 5/2002 | Cook et al. |
| 2002/0065892 A1 | 5/2002 | Malik |
| 2002/0069365 A1 | 6/2002 | Howard et al. |
| 2002/0078343 A1 | 6/2002 | Rubin et al. |
| 2002/0078361 A1 | 6/2002 | Giroux et al. |
| 2002/0083016 A1 | 6/2002 | Dittrich et al. |
| 2002/0087720 A1 | 7/2002 | Davis et al. |
| 2002/0091745 A1 | 7/2002 | Ramamurthy |
| 2002/0091775 A1 | 7/2002 | Morehead et al. |
| 2002/0095399 A1 | 7/2002 | Devine |
| 2002/0098831 A1 | 7/2002 | Castell et al. |
| 2002/0099826 A1 | 7/2002 | Summers |
| 2002/0107950 A1 | 8/2002 | Lu |
| 2002/0112155 A1 | 8/2002 | Martherus et al. |
| 2002/0120646 A1 | 8/2002 | Dutta et al. |
| 2002/0129140 A1 | 9/2002 | Peled et al. |
| 2002/0143865 A1 | 10/2002 | Tung Loo |
| 2002/0149569 A1 | 10/2002 | Dutta et al. |
| 2002/0194470 A1 | 12/2002 | Grupe |
| 2003/0009672 A1 | 1/2003 | Goodman |
| 2003/0023580 A1 | 1/2003 | Braud et al. |
| 2003/0028809 A1 | 2/2003 | Goodman et al. |
| 2003/0050046 A1 | 3/2003 | Conneely et al. |
| 2003/0054810 A1 | 3/2003 | Chen et al. |
| 2003/0055897 A1 | 3/2003 | Brown et al. |
| 2003/0061215 A1 | 3/2003 | Messina |
| 2003/0074248 A1 | 4/2003 | Braud |
| 2003/0074397 A1 | 4/2003 | Morin et al. |
| 2003/0074552 A1 | 4/2003 | Olkin et al. |
| 2003/0074580 A1 | 4/2003 | Knouse et al. |
| 2003/0078890 A1 | 4/2003 | Schmidt et al. |
| 2003/0100292 A1 | 5/2003 | Kynast et al. |
| 2003/0120948 A1 | 6/2003 | Schmidt et al. |
| 2003/0126215 A1 | 7/2003 | Udell et al. |
| 2003/0126259 A1 | 7/2003 | Yoshida et al. |
| 2003/0131055 A1 | 7/2003 | Yashchin et al. |
| 2003/0131060 A1 | 7/2003 | Hartselle et al. |
| 2003/0147378 A1 | 8/2003 | Glasser et al. |
| 2003/0149737 A1 | 8/2003 | Lambert et al. |
| 2003/0154249 A1 | 8/2003 | Crockett et al. |
| 2003/0154292 A1 | 8/2003 | Spriestersbach et al. |
| 2003/0163538 A1 | 8/2003 | Yeh et al. |
| 2003/0167350 A1 | 9/2003 | Davis et al. |
| 2003/0224810 A1 | 12/2003 | Enzmann et al. |
| 2004/0002903 A1 | 1/2004 | Stolfo et al. |
| 2004/0015729 A1 | 1/2004 | Elms et al. |
| 2004/0019846 A1 | 1/2004 | Castellani et al. |
| 2004/0024788 A1 | 2/2004 | Hill et al. |
| 2004/0030918 A1 | 2/2004 | Karamchedu et al. |
| 2004/0049436 A1 | 3/2004 | Brand et al. |
| 2004/0051736 A1 | 3/2004 | Daniell |
| 2004/0051897 A1 | 3/2004 | Kakiuchi et al. |
| 2004/0059790 A1 * | 3/2004 | Austin-Lane ......... H04L 51/04 709/207 |
| 2004/0068486 A1 | 4/2004 | Chidlovskii |
| 2004/0121762 A1 | 6/2004 | Chou et al. |
| 2004/0133599 A1 | 7/2004 | Warren et al. |

(56) References Cited

U.S. PATENT DOCUMENTS

| | | |
|---|---|---|
| 2004/0133643 A1 | 7/2004 | Warren et al. |
| 2004/0133644 A1 | 7/2004 | Warren et al. |
| 2004/0177110 A1 | 9/2004 | Rounthwaite et al. |
| 2004/0188151 A1 | 9/2004 | Gerpheide et al. |
| 2004/0189616 A1 | 9/2004 | Gerpheide et al. |
| 2004/0189617 A1 | 9/2004 | Gerpheide et al. |
| 2004/0193591 A1 | 9/2004 | Winter |
| 2004/0193695 A1 | 9/2004 | Salo |
| 2004/0210632 A1 | 10/2004 | Carlson et al. |
| 2004/0210796 A1 | 10/2004 | Largman et al. |
| 2004/0234046 A1 | 11/2004 | Skladman |
| 2004/0243679 A1 | 12/2004 | Tyler |
| 2004/0249892 A1* | 12/2004 | Barriga ............ H04L 12/583 709/206 |
| 2005/0010643 A1 | 1/2005 | Fellenstein et al. |
| 2005/0027846 A1 | 2/2005 | Wolfe et al. |
| 2005/0064883 A1 | 3/2005 | Heck |
| 2005/0071178 A1 | 3/2005 | Beckstrom et al. |
| 2005/0071282 A1 | 3/2005 | Lu et al. |
| 2005/0086186 A1 | 4/2005 | Sullivan et al. |
| 2005/0091501 A1 | 4/2005 | Osthoff et al. |
| 2005/0120230 A1 | 6/2005 | Waterson |
| 2005/0130631 A1 | 6/2005 | Maguire |
| 2005/0132010 A1 | 6/2005 | Muller |
| 2005/0132013 A1 | 6/2005 | Karstens |
| 2005/0132372 A1 | 6/2005 | Vargas et al. |
| 2005/0144246 A1 | 6/2005 | Malik |
| 2005/0193068 A1 | 9/2005 | Brown et al. |
| 2005/0198365 A1 | 9/2005 | Wei |
| 2005/0204005 A1 | 9/2005 | Purcell et al. |
| 2005/0204008 A1 | 9/2005 | Shinbrood |
| 2005/0204130 A1 | 9/2005 | Harris |
| 2005/0209903 A1 | 9/2005 | Hunter et al. |
| 2005/0229258 A1 | 10/2005 | Pigin |
| 2005/0240666 A1 | 10/2005 | Xu et al. |
| 2005/0240759 A1 | 10/2005 | Rubin et al. |
| 2005/0251399 A1 | 11/2005 | Agarwal et al. |
| 2005/0256929 A1 | 11/2005 | Bartol et al. |
| 2005/0266836 A1 | 12/2005 | Shan |
| 2005/0277431 A1 | 12/2005 | White |
| 2005/0283621 A1 | 12/2005 | Sato et al. |
| 2005/0289601 A1 | 12/2005 | Park et al. |
| 2006/0010215 A1 | 1/2006 | Clegg et al. |
| 2006/0020714 A1 | 1/2006 | Girouard et al. |
| 2006/0031483 A1 | 2/2006 | Lund et al. |
| 2006/0041751 A1 | 2/2006 | Rogers et al. |
| 2006/0046758 A1 | 3/2006 | Emami-Nouri |
| 2006/0047748 A1 | 3/2006 | Kelso et al. |
| 2006/0075473 A1 | 4/2006 | Moreh |
| 2006/0095502 A1 | 5/2006 | Lewis et al. |
| 2006/0129697 A1 | 6/2006 | Vange et al. |
| 2006/0129823 A1 | 6/2006 | McCarthy et al. |
| 2006/0140347 A1 | 6/2006 | Kaji |
| 2006/0168058 A1 | 7/2006 | Midgley |
| 2006/0177007 A1 | 8/2006 | Vaghar |
| 2006/0208871 A1 | 9/2006 | Hansen |
| 2006/0212561 A1 | 9/2006 | Feng |
| 2006/0217126 A1 | 9/2006 | Sohm et al. |
| 2006/0223554 A1 | 10/2006 | Fried |
| 2006/0229899 A1 | 10/2006 | Hyder et al. |
| 2006/0234680 A1 | 10/2006 | Doulton |
| 2006/0235824 A1 | 10/2006 | Cheung et al. |
| 2006/0236095 A1 | 10/2006 | Smith |
| 2006/0248599 A1 | 11/2006 | Sack |
| 2006/0259492 A1 | 11/2006 | Jun et al. |
| 2006/0265453 A1 | 11/2006 | Kaminsky et al. |
| 2006/0282426 A1 | 12/2006 | Spears |
| 2006/0284852 A1* | 12/2006 | Hofmeister ............ G06F 3/0483 345/173 |
| 2007/0013662 A1 | 1/2007 | Fauth |
| 2007/0038715 A1 | 2/2007 | Collins et al. |
| 2007/0061399 A1* | 3/2007 | Schmieder ............ G06F 9/54 709/204 |
| 2007/0063999 A1 | 3/2007 | Park |
| 2007/0071222 A1 | 3/2007 | Flockhart et al. |
| 2007/0074018 A1 | 3/2007 | Edwards |
| 2007/0077921 A1 | 4/2007 | Hayashi et al. |
| 2007/0078675 A1 | 4/2007 | Kaplan |
| 2007/0083675 A1 | 4/2007 | Vemulapelli et al. |
| 2007/0083929 A1 | 4/2007 | Sprosts et al. |
| 2007/0113287 A1 | 5/2007 | Blumenau |
| 2007/0113288 A1 | 5/2007 | Blumenau |
| 2007/0113289 A1 | 5/2007 | Blumenau |
| 2007/0113293 A1 | 5/2007 | Blumenau |
| 2007/0116001 A1 | 5/2007 | Kobayashi et al. |
| 2007/0130329 A1 | 6/2007 | Shah |
| 2007/0133034 A1 | 6/2007 | Jindal et al. |
| 2007/0136428 A1 | 6/2007 | Boutboul et al. |
| 2007/0143423 A1 | 6/2007 | Kieselbach et al. |
| 2007/0177568 A1 | 8/2007 | Clontz et al. |
| 2007/0217393 A1 | 9/2007 | Lee et al. |
| 2007/0233790 A1 | 10/2007 | Agarwal et al. |
| 2007/0250619 A1 | 10/2007 | Li et al. |
| 2008/0077704 A1 | 3/2008 | Shah et al. |
| 2008/0126496 A1 | 5/2008 | Warren et al. |
| 2008/0201440 A1 | 8/2008 | Shah et al. |
| 2008/0208998 A1 | 8/2008 | Warren et al. |
| 2008/0281930 A1 | 11/2008 | Hartselle et al. |
| 2008/0313296 A1 | 12/2008 | Muller |
| 2008/0320092 A1 | 12/2008 | Campbell et al. |
| 2009/0116492 A1 | 5/2009 | Maeda |
| 2009/0254994 A1 | 10/2009 | Waterson |
| 2010/0064016 A1 | 3/2010 | Collins et al. |
| 2010/0077360 A1 | 3/2010 | Nason et al. |
| 2010/0082979 A1 | 4/2010 | Edwards |
| 2010/0131868 A1* | 5/2010 | Chawla ............ G06F 3/044 715/759 |
| 2010/0157998 A1 | 6/2010 | Vange et al. |
| 2011/0030052 A1 | 2/2011 | Harris |
| 2011/0061099 A1 | 3/2011 | Jiang et al. |
| 2011/0161448 A1 | 6/2011 | Warren et al. |
| 2011/0238860 A1 | 9/2011 | Vange et al. |
| 2011/0246665 A1 | 10/2011 | Vange et al. |
| 2011/0302321 A1 | 12/2011 | Vange et al. |
| 2012/0036452 A1* | 2/2012 | Coleman ............ G06F 21/55 715/751 |
| 2012/0054308 A1 | 3/2012 | Vange et al. |
| 2012/0059907 A1 | 3/2012 | Vange et al. |
| 2012/0203849 A1 | 8/2012 | Collins et al. |
| 2013/0159436 A1 | 6/2013 | Hartselle et al. |
| 2013/0290443 A1 | 10/2013 | Collins et al. |
| 2014/0074981 A1 | 3/2014 | Vange et al. |
| 2014/0181689 A1 | 6/2014 | Collins et al. |
| 2014/0201295 A1 | 7/2014 | Collins et al. |
| 2014/0207887 A1 | 7/2014 | Hartselle et al. |
| 2015/0100657 A1 | 4/2015 | Collins et al. |
| 2015/0106459 A1 | 4/2015 | Collins et al. |
| 2015/0106460 A1 | 4/2015 | Collins et al. |
| 2015/0106461 A1 | 4/2015 | Collins et al. |
| 2015/0106743 A1 | 4/2015 | Collins et al. |
| 2015/0106744 A1 | 4/2015 | Collins et al. |
| 2015/0180905 A1* | 6/2015 | Ruppin ............ G06F 21/10 726/1 |
| 2015/0180938 A1* | 6/2015 | Ruppin ............ G06F 21/10 726/30 |
| 2015/0215359 A1* | 7/2015 | Bao ............ H04L 65/605 709/219 |
| 2015/0237021 A1* | 8/2015 | Sovio ............ H04L 63/0428 713/168 |
| 2015/0244664 A1* | 8/2015 | Kendal ............ H04L 51/14 709/206 |
| 2015/0248557 A1* | 9/2015 | Sallam ............ G06F 21/554 726/23 |

FOREIGN PATENT DOCUMENTS

| | | |
|---|---|---|
| EP | 918420 A2 | 5/1999 |
| EP | 994608 A2 | 4/2000 |
| EP | 1113631 A2 | 4/2001 |
| EP | 1388986 A1 | 2/2004 |
| GB | 2430591 B | 9/2010 |
| JP | H11-163923 | 6/1999 |
| JP | 2000/10879 | 1/2000 |
| JP | 2003/114852 | 4/2003 |

(56) References Cited

FOREIGN PATENT DOCUMENTS

| | | |
|---|---|---|
| JP | 2004/038407 | 2/2004 |
| JP | 2004/126973 | 4/2004 |
| JP | 2004/341813 A | 12/2004 |
| WO | 98/59456 A2 | 12/1998 |
| WO | 2004/095814 A1 | 11/2004 |
| WO | 2006/088915 A1 | 8/2006 |
| WO | 2006/114135 A1 | 11/2006 |
| WO | 2007/018636 A2 | 2/2007 |
| WO | 2008/036971 A2 | 3/2008 |
| WO | 2008/101165 A2 | 8/2008 |
| WO | 2010/151873 A1 | 12/2010 |
| WO | 2013/158603 A1 | 10/2013 |
| WO | 2013/158765 A1 | 10/2013 |
| WO | 2014/047489 A2 | 3/2014 |

OTHER PUBLICATIONS

U.S. Appl. No. 13/477,932, filed May 21, 2015, Office Action.
Henry, Paul and Luo, Hui. "Off the record Email System" (document and presentation). Presentation at IEEE Conference on Computer Communications (Infocom) Apr. 2001, Anchorage, Alaska, USA; last found at http://www.research.att.com:9000/~macsbug/Other_Cool_Stuff/OTREM/otrem.html on Apr. 7, 2006.
Bass, Steve. "50 fixes for the biggest PC annoyances: Windows gone wacky? Hardware gone haywire? Software gone screwy? Take a deep breath—help is here." [online] Oct. 1, 2003. [retrieved on Mar. 8, 2009] PC-World. [Retrieved from http://www.accessmylibrary.com/coms2/summary_0286-24479177_ITM] p. 3 Paragraph 5-7.
Gulco, Ceki and Tsudik, Gene. "Mixing E-mail with Babel." Proceedings of the Symposium on Network and Distributed System Security, XP-002086536, Jan. 1, 1996, pp. 2-16.
Elkins, Michael. "The Mutt E-mail Client." ftp://ftp.nluug.nl/pub/mail/mutt/historic/mutt-1.Opre2.tar.gz, XP-002245042, Sep. 1, 1999.
U.S. Appl. No. 11/401,148, filed Mar. 13, 2009, First Office Action, U.S. Appl. No. U.S. Pat. No. 7,610,345.
U.S. Appl. No. 11/401,148, filed Jun. 10, 2009, Interview Summary, U.S. Pat. No. 7,610,345.
U.S. Appl. No. 11/401,148, filed Jun. 15, 2009, Response to Office Action, U.S. Pat. No. 7,610,345.
U.S. Appl. No. 11/401,148, filed Aug. 25, 2009, Notice of Allowance, U.S. Pat. No. 7,610,345.
U.S. Appl. No. 11/401,148, filed Aug. 25, 2009, Rule 312 Amendment, U.S. Pat. No. 7,610,345.
U.S. Appl. No. 11/401,148, filed Oct. 7, 2009, Issue Notification, U.S. Pat. No. 7,610,345.
U.S. Appl. No. 11/859,777, filed Aug. 19, 2009, Office Action.
U.S. Appl. No. 12/031,845, filed Sep. 29, 2010, Office Action.
U.S. Appl. No. 12/605,885, filed Jan. 25, 2011, Office Action, U.S. Pat. No. 8,291,026.
U.S. Appl. No. 12/605,885, filed May 25, 2011, Response to Office Action, U.S. Pat. No. 8,291,026.
U.S. Appl. No. 12/605,885, filed Jun. 14, 2011, Examiner Interview Summary, U.S. Pat. No. 8,291,026.
U.S. Appl. No. 12/605,885, filed Aug. 4, 2011, Final Office Action, U.S. Pat. No. 8,291,026.
U.S. Appl. No. 12/605,885, filed Nov. 23, 2011, Examiner Interview Summary, U.S. Pat. No. 8,291,026.
U.S. Appl. No. 12/605,885, filed Jan. 4, 2012, Response to Final Office Action and RCE, U.S. Pat. No. 8,291,026.
U.S. Appl. No. 12/605,885, filed Jun. 11, 2012, Notice of Allowance, U.S. Pat. No. 8,291,026.
U.S. Appl. No. 13/447,932, filed Jan. 9, 2014, Response to Office Action.
U.S. Appl. No. 13/447,932, filed Sep. 9, 2014, Office Action.
U.S. Appl. No. 13/447,932, filed Mar. 19, 2015, Notice of Allowance.
U.S. Appl. No. 14/133,875, filed May 21, 2014, Office Action, U.S. Pat. No. 8,935,351.
U.S. Appl. No. 14/133,875, filed May 28, 2014, Supplemental Office Action, U.S. Pat. No. 8,935,351.
U.S. Appl. No. 14/133,875, filed Jun. 9, 2014, Examiner Interview Summary, U.S. Pat. No. 8,935,351.
U.S. Appl. No. 14/133,875, filed Jun. 23, 2014, Examiner Interview Summary, U.S. Pat. No. 8,935,351.
U.S. Appl. No. 14/133,875, filed Jul. 14, 2014, Response to Office Action, U.S. Pat. No. 8,935,351.
U.S. Appl. No. 14/133,875, filed Jul. 23, 2014, Resubmission of Terminal Disclaimers, U.S. Pat. No. 8,935,351.
U.S. Appl. No. 14/133,875, filed Aug. 15, 2014, Notice of Allowance, U.S. Pat. No. 8,935,351.
U.S. Appl. No. 14/133,875, filed Dec. 23, 2014, Issue Notification, U.S. Pat. No. 8,935,351.
U.S. Appl. No. 14/133,897, filed May 28, 2014, Office Action, U.S. Pat. No. 8,886,739.
U.S. Appl. No. 14/133,897, filed Jun. 9, 2014, Examiner Interview Summary, U.S. Pat. No. 8,886,739.
U.S. Appl. No. 14/133,897, filed Jun. 23, 2014, Examiner Interview Summary, U.S. Pat. No. 8,886,739.
U.S. Appl. No. 14/133,897, filed Jul. 14, 2014, Response to Office Action, U.S. Pat. No. 8,886,739.
U.S. Appl. No. 14/133,897, filed Jul. 23, 2014, Resubmission of Terminal Disclaimers, U.S. Pat. No. 8,886,739.
U.S. Appl. No. 14/133,897, filed Aug. 5, 2014, Notice of Allowance, U.S. Pat. No. 8,886,739.
U.S. Appl. No. 14/133,897, filed Oct. 22, 2014, Issue Notification, U.S. Pat. No. 8,886,739.
PCT/US2006/014254, WO, Oct. 19, 2007, International Search Report and Written Opinion.
PCT/US2007/079299, WO, Mar. 18, 2008, International Search Report and Written Opinion.
PCT/US2008/054093, WO, Jul. 25, 2008, International Search Report and Written Opinion.
PCT/US2013/036723, WO, Aug. 20, 2013, International Search Report and Written Opinion.
2006276974, AU, Feb. 8, 2012, Examiner's Report (No. 2).
2006276974, AU, Aug. 3, 2012, Response to Examiner's Report (No. 2).
2616911, CA, Feb. 25, 2013, Office Action.
2616911, CA, Aug. 23, 2013, Response to Office Action.
CN2006-80035550, CN, Jan. 22, 2010, Office Action (English Translation).
CN2009-80035550, CN, Dec. 21, 2011, Office Action (English Translation).
CN2006-80035550, CN, Jul. 13, 2012, Office Action (English Translation).
EU06750321.9, EU, Apr. 13, 2010, Supplementary Search Report.
EU06750321.9, EU, Jul. 6, 2010, Response to Search Report.
EU06750321.9, EU, Dec. 22, 2011, Examination Report.
EU06750321.9, EU, Jun. 22, 2012, Response to Examination Report.
382/KOLNP/2008, IN, May 27, 2014, Examination Report.
2008-523868, JP, Apr. 27, 2011, Office Action (English Letter Translating Objections).
2008-523868, JP, Nov. 7, 2011, Response to Office Action (English Proposed Arguments and Claim Amendments).
7004841/2008, KR, Nov. 2, 2012, Letter Reporting Notice of Preliminary Rejection.
TW095119990, TW, Oct. 18, 2012, Translation of Examination Report.
TW095119990, TW, May 8, 2013, English Summary of Arguments and Claims Responsing to Examination Report.
U.S. Appl. No. 11/401,148, filed Apr. 10, 2006, U.S. Pat. No. 7,610,345.
U.S. Appl. No. 11/859,777, filed Sep. 23, 2007.
U.S. Appl. No. 12/031,845, filed Feb. 15, 2008.
U.S. Appl. No. 12/605,885, filed Oct. 26, 2009, U.S. Pat. No. 8,291,026.
U.S. Appl. No. 13/447,932, filed Apr. 16, 2012.
U.S. Appl. No. 13/651,909, filed Oct. 15, 2012.
U.S. Appl. No. 13/864,930, filed Apr. 17, 2013.
U.S. Appl. No. 14/033,135, filed Sep. 20, 2013.
U.S. Appl. No. 14/133,875, filed Dec. 19, 2013, U.S. Pat. No. 8,935,351.

(56) References Cited

OTHER PUBLICATIONS

U.S. Appl. No. 14/133,897, filed Dec. 19, 2013, U.S. Pat. No. 8,886,739.
U.S. Appl. No. 14/572,920, filed Dec. 17, 2014.
U.S. Appl. No. 14/572,932, filed Dec. 17, 2014.
U.S. Appl. No. 14/572,942, filed Dec. 17, 2014.
U.S. Appl. No. 14/572,952, filed Dec. 17, 2014.
U.S. Appl. No. 14/572,966, filed Dec. 17, 2014.
U.S. Appl. No. 14/572,976, filed Dec. 17, 2014.
U.S. Appl. No. 14/572,966, filed Dec. 23, 2015, Office Action.
U.S. Appl. No. 14/572,920, filed Jan. 15, 2016, Response to Office Action with.
U.S. Appl. No. 13/447,932, filed Dec. 11, 2015, Response to Office Action with.
U.S. Appl. No. 13/447,932, filed Jan. 11, 2016, Examiner Interview Summary.
U.S. Appl. No. 14/572,942, filed Dec. 17, 2015, Preliminary Amendment.
U.S. Appl. No. 14/572,952, filed Dec. 17, 2015, Preliminary Amendment.
U.S. Appl. No. 14/572,976, filed Dec. 16, 2015, Office Action.
U.S. Appl. No. 14/572,942, filed Dec. 22, 2015, Office Action.
U.S. Appl. No. 14/572,952, filed Dec. 23, 2015, Office Action.
U.S. Appl. No. 13/651,909, filed Dec. 21, 2015, Notice of Abandonment.
U.S. Appl. No. 14/572,942, filed Jan. 15, 2016, Response to Office Action with.
U.S. Appl. No. 14/572,952, filed Jan. 15, 2016, Response to Office Action with.
U.S. Appl. No. 14/572,966, filed Jan. 15, 2016, Response to Office Action with.
U.S. Appl. No. 14/572,976, filed Jan. 15, 2016, Response to Office Action with.
Klensin, J. (ed.). Request for Comment 2821: "Simple Mail Transfer Protocol." The Internet Society. Apr. 2001. Retrieved from https://www.ietf.org/rfc/rfc2821.txt, last visited Dec. 11, 2015.
Wroblewski, Luke. "Web Application Form Design." Jan. 22, 2005. Retrieved from http://www.lukew.com/ff/entry.asp?1502, last visited Dec. 11, 2015.
Eide Kristian. "The Next Generation of Mail Clients." LWN.net. Feb. 25, 2004. Retrieved from https://lwn.net/Articles/72937/, last visited Dec. 11, 2015.
Garrett, Jesse James. "Yahoo! Mail: Simplicity Holds Up Over Time." BoxesandArrows.com. Mar. 11, 2002. Retrieved from http://boxesandarrows.com/yahoo-mail-simplicity-holds-up-over-time/, last visited Dec. 11, 2015.
Jarrett, Caroline. "Designing Usable Forms: The Three Layer Model of the Form." Effortmark. Excerpt from St. Francis Leprosy Guild Forms. 2000.
Spolsky, Joel. "User Interface Design for Programmers." Apress. 2001.
Garrett, Jesse James. "Yahoo! Mail." Dec. 28, 2001. From BoxesandArrows.com.
GSM Application Style Guide. Openwave Systems Inc. Feb. 2001.
U.S. Appl. No. 13/447,932, filed Jun. 24, 2015, Applicant Initiated Interview Summary.
U.S. Appl. No. 13/447,932, filed Jul. 16, 2015, Office Action (Supplemental).
U.S. Appl. No. 13/447,932, filed Dec. 11, 2015, Applicant Initiated Interview Summary.
U.S. Appl. No. 13/864,930, filed Nov. 6, 2015, Office Action.
U.S. Appl. No. 14/572,966, filed Dec. 3, 2015, Office Action.
U.S. Appl. No. 14/572,920, filed Dec. 11, 2015, Preliminary Amendment.
U.S. Appl. No. 14/572,932, filed Dec. 9, 2015, Preliminary Amendment.
U.S. Appl. No. 14/572,976, filed Dec. 10, 2015, Preliminary Amendment.
U.S. Appl. No. 13/447,932, Jan. 11, 2016, Examiner Initiated Interview Summary.
U.S. Appl. No. 13/477,932, Jan. 22, 2016, Notice of Allowance.
U.S. Appl. No. 14/572,920, Feb. 18, 2016, Notice of Allowance.
U.S. Appl. No. 14/572,942, Feb. 17, 2016, Notice of Allowance.
U.S. Appl. No. 14/572,952, Feb. 18, 2016, Notice of Allowance.
U.S. Appl. No. 14/572,966, Feb. 18, 2016, Notice of Allowance.
U.S. Appl. No. 14/572,976, Feb. 18, 2016, Notice of Allowance.
U.S. Appl. No. 13/447/932, Feb. 17, 2016, Issue Notification.
U.S. Appl. No. 14,572,920, Feb. 18, 2016, 1.312 Amendment after Notice of Allowance.
U.S. Appl. No. 14,572,942, Feb. 18, 2016, 1.312 Amendment after Notice of Allowance.
U.S. Appl. No. 14,572,952, Feb. 18, 2016, 1.312 Amendment after Notice of Allowance.
U.S. Appl. No. 14,572,966, Feb. 18, 2016, 1.312 Amendment after Notice of Allowance.
U.S. Appl. No. 14,572,976, Feb. 18, 2016, 1.312 Amendment after Notice of Allowance.

* cited by examiner

ELECTRONIC MESSAGE SEND DEVICE HANDLING SYSTEM AND METHOD WITH SEPARATED DISPLAY AND TRANSMISSION OF MESSAGE CONTENT AND HEADER INFORMATION

RELATED APPLICATION DATA

This application is a continuation application of U.S. patent application Ser. No. 14/133,875, filed Dec. 19, 2013, and titled "Electronic Message Content and Header Restrictive Recipient Handling System and Method," which is a continuation application of U.S. patent application Ser. No. 13/651,909, filed Oct. 15, 2012, and titled "Disassociated Content Electronic Message System and Method," which is a continuation application of U.S. patent application Ser. No. 12/605,885, filed Oct. 26, 2009, and titled "Reduced Traceability Electronic Message System and Method For Sending Header Information Before Message Content," now U.S. Pat. No. 8,291,026, which is a continuation application of U.S. patent application Ser. No. 11/401,148, filed Apr. 10, 2006, and titled "Reduced Traceability Electronic System and Method," now U.S. Pat. No. 7,610,345, each of which is incorporated by reference herein in its entirety. This application also claims the benefit of priority of U.S. Provisional Patent Application Ser. No. 60/703,367, filed Jul. 28, 2005, and titled "Method and System for Reducing Traceability of Electronic Messages," which is incorporated by reference herein in its entirety.

This application is also related to the following commonly-owned applications: U.S. patent application Ser. No. 14/572,920, filed Dec. 17, 2014, and titled "Electronic Message Send Device Handling System and Method with Separation of Message Content and Header Information," U.S. patent application Ser. No. 14/572,942, filed Dec. 17, 2014, and titled "Electronic Message Send Device Handling System and Method with Media Component and Header Information Separation," U.S. patent application Ser. No. 14/572,952, filed Dec. 17, 2014, and titled "Electronic Message Recipient Handling System and Method with Separation of Message Content and Header Information," U.S. patent application Ser. No. 14/572,966, filed Dec. 17, 2014, and titled "Electronic Message Recipient Handling System and Method with Separated Display of Message Content and Header Information," U.S. patent application Ser. No. 14/572,976, filed Dec. 17, 2014, and titled "Electronic Message Recipient Handling System and Method with Media Component and Header Information Separation," U.S. patent application Ser. No. 13/447,932, filed Apr. 16, 2012, and titled "Reduced Traceability Electronic Message System and Method," and U.S. patent application Ser. No. 14/133,897, filed Dec. 19, 2013, and titled "Electronic Message Content and Header Restrictive Send Device Handling System and Method," now U.S. Pat. No. 8,886,739, each of which is incorporated by reference herein in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the U.S. Patent and Trademark Office patent files or records, but otherwise reserves all copyright rights whatsoever.

FIELD OF THE INVENTION

The present invention generally relates to the field of electronic messaging. In particular, the present invention is directed to an electronic message send device handling system and method with separated display and transmission of message content and header information.

BACKGROUND

Typically, an electronic message between two people is not private. It may travel along a public network, such as the Internet, and be susceptible to interception by unintended third parties. Messages are also logged and archived by the communication systems themselves. They may also be copied, cut, pasted, printed, forwarded, blind copied, or otherwise manipulated. This may give a message a "shelf-life" that is often uncontrollable by the sender or even the recipient. Surreptitious logging (e.g., by keystroke and message recording software) may occur by third parties that have gained unauthorized access to either the computer of the sender and/or the recipient. Electronic messages include the message content itself coupled to identifying information regarding the sender, the recipient, the location of the message, times and dates associated with the message, etc. This allows a third party that is logging messages, intercepting messages, or simply gaining access to the messaging system's logs or inbox archives to associate the potentially important identifying information (typically referred to as header information) with the message content. These are only some of the ways in which electronic messages can be misused. There is a demand for a system and method for reducing the traceability of electronic messages.

SUMMARY OF THE DISCLOSURE

In one implementation, a computer-implemented method of handling an electronic message is provided. The method includes associating a message content including a media component with the electronic message via a first display at a sending user device; associating an identifier of a recipient with the electronic message via a second display at the sending user device, the first and second displays not being displayed at the same time, the identifier of a recipient being part of a header information for the electronic message, the header information not being displayed with the media component via the first display; providing a unique correlation of the message content including a media component with the recipient address; transmitting the message content including a media component from the sending user device to a server computer; and transmitting the identifier of a recipient from the sending user device to the server computer, said transmitting the message content including a media component and said transmitting the identifier of a recipient occurring separately.

In another implementation, a machine readable hardware storage medium containing machine executable instructions implementing a method of handling an electronic message is provided. The instructions include a set of instructions for associating a message content including a media component with the electronic message via a first display at a sending user device; a set of instructions for associating an identifier of a recipient with the electronic message via a second display at the sending user device, the first and second displays not being displayed at the same time, the identifier of a recipient being part of a header information for the electronic message, the header information not being displayed with the media component via the first display; a set of instructions for providing a unique correlation of the message content including a media component with the recipient address; a set of instructions for transmitting the message content including a media component from the sending user device to a server computer; and a set of instructions for transmitting the identifier of a recipient from the sending user device to the server computer, said transmitting the message content including a media component and said transmitting the identifier of a recipient occurring separately.

In yet another implementation, a system for handling an electronic message is provided. The system includes a means for associating a message content including a media component with the electronic message via a first display at a sending user device; a means for associating an identifier of a recipient with the electronic message via a second display at the sending user device, the first and second displays not being displayed at the same time, the identifier of a recipient being part of a header information for the electronic message, the header information not being displayed with the media component via the first display; a means for providing a unique correlation of the message content including a media component with the recipient address; a means for transmitting the message content including a media component from the sending user device to a server computer; and a means for transmitting the identifier of a recipient from the sending user device to the server computer, said transmitting the message content including a media component and said transmitting the identifier of a recipient occurring separately.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

The present disclosure provides a system and method reducing traceability of an electronic message. In one embodiment, header information and message content of an electronic message are displayed by a system and method of the present disclosure so that header information and message content are not displayed at the same time. As will be clear to one skilled in the art from the disclosure below, separation of header information from message content reduces the traceability of the electronic message. To further reduce traceability of an electronic message, header information may be automatically deleted at a first predetermined time and message content may be automatically deleted at a second predetermined time (e.g., after message content is viewed). In one example, the first and second predetermined times may occur sequentially (e.g., deleting header information upon displaying message content and deleting message content upon closing a display of message content), simultaneously (e.g., deleting message content and associated header information upon closing a display of message content), or out of order such that the second predetermined time occurs before the first predetermined time (e.g., displaying message content first, deleting message content, displaying header information, then deleting header information). These and other aspects of the present disclosure will be described in greater detail below with respect to various exemplary embodiments illustrated in FIGS. 1 to 11.

Figure 1:
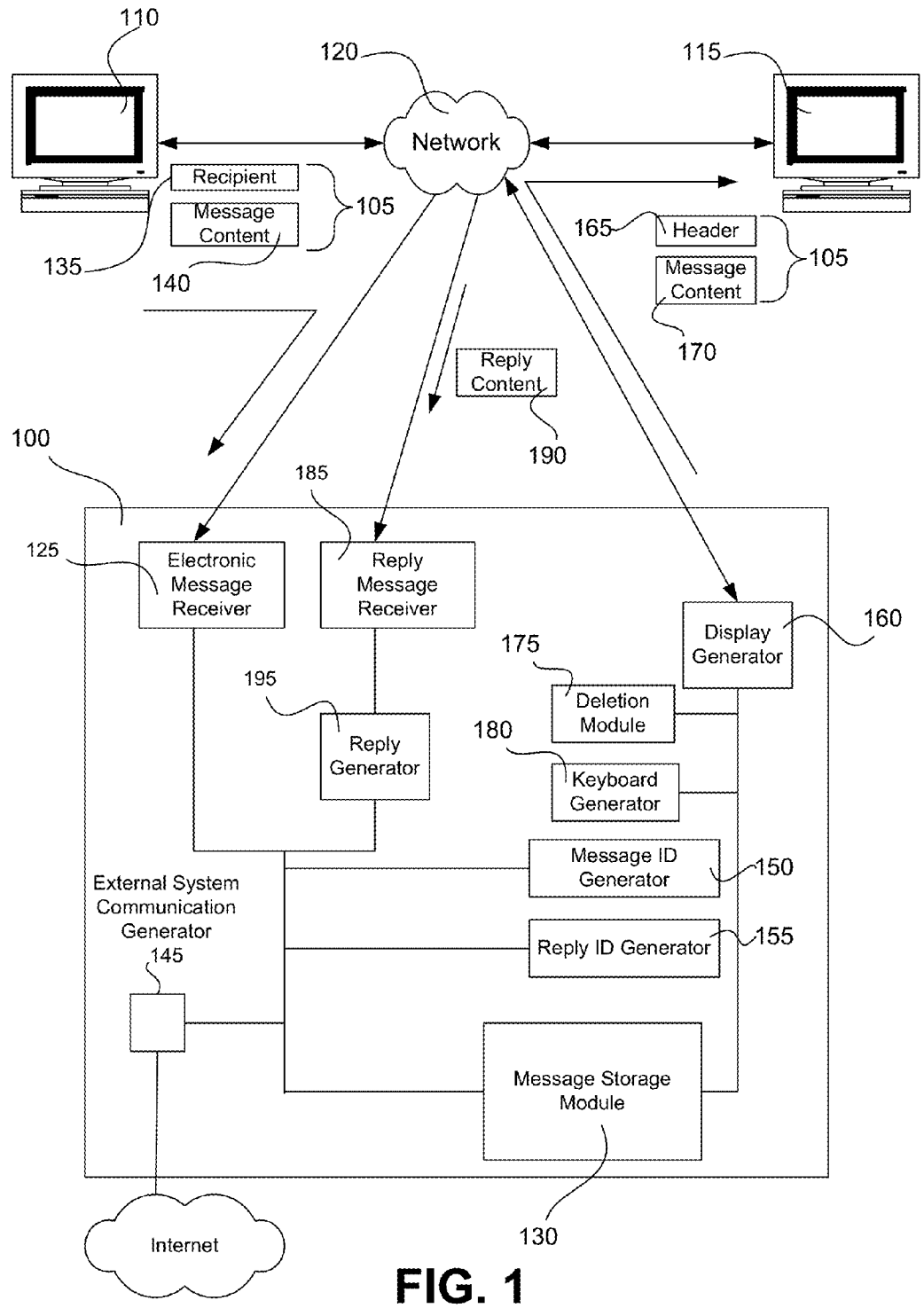
FIG. 1 illustrates one example of a schematic diagram of an exemplary system for electronic messaging depicting an initial electronic message being communicating from one user to another.

FIG. 1 illustrates one embodiment of a system 100 for electronic messaging depicting an electronic message 105 being sent from one user to another. System 100 may include any number of computers, such as the two user computers 110 and 115, coupled to a network 120. Network 120 facilitates communication between computer 110 and computer 115. In one example, system 100 may be a closed system that may utilize open network structures (e.g., the Internet) for communication with users, but that does not utilize open or third-party messaging systems (e.g., industry standard email) that may increase the chance of message logging and impact the recordless nature of an electronic message of the present disclosure. System 100 allows users of computers 110 and 115 to communicate with each other via one or more electronic messages, such as electronic message 105 over network 120. As will be described in further detail hereinafter, several aspects of system 100 reduce traceability of electronic messages, such as electronic message 105. In one example, electronic message 105 is automatically deleted from system 100 after it is viewed by the recipient to ensure that electronic message 105 cannot be forensically recreated and to ensure there is no record of electronic message 105 ever existing on system 100 thereafter.

Although computers 110 and 115 are illustrated as workstation computers, any well known computer may be utilized in creating and/or viewing electronic messages. Example computers include, but are not limited to, a personal computer, a workstation computer, a server computer, a laptop computer, a handheld device, a mobile telephone, a personal digital assistant (PDA), another computing device capable of communicating an electronic message via network 120, and any combinations thereof. System 100 may include one or more server computers. In one example, system 100 may reside substantially on a single server computer. In another example, system 100 may be distributed across two or more server computers. In yet another example, system 100 may be distributed across a plurality of user computers without a server computer, such as in a peer-to-peer environment. In one such example, components of a messaging system according to the present disclosure and/or their functionality (e.g., storage of header information and message content, display generation, reply generation, etc.) may occur at a recipient's user computer In still another example, system 100 may be distributed across one or more server computers and one or more user computers. One or more relay servers or other systems may be utilized between server computers and/or user computers.

Figure 2:
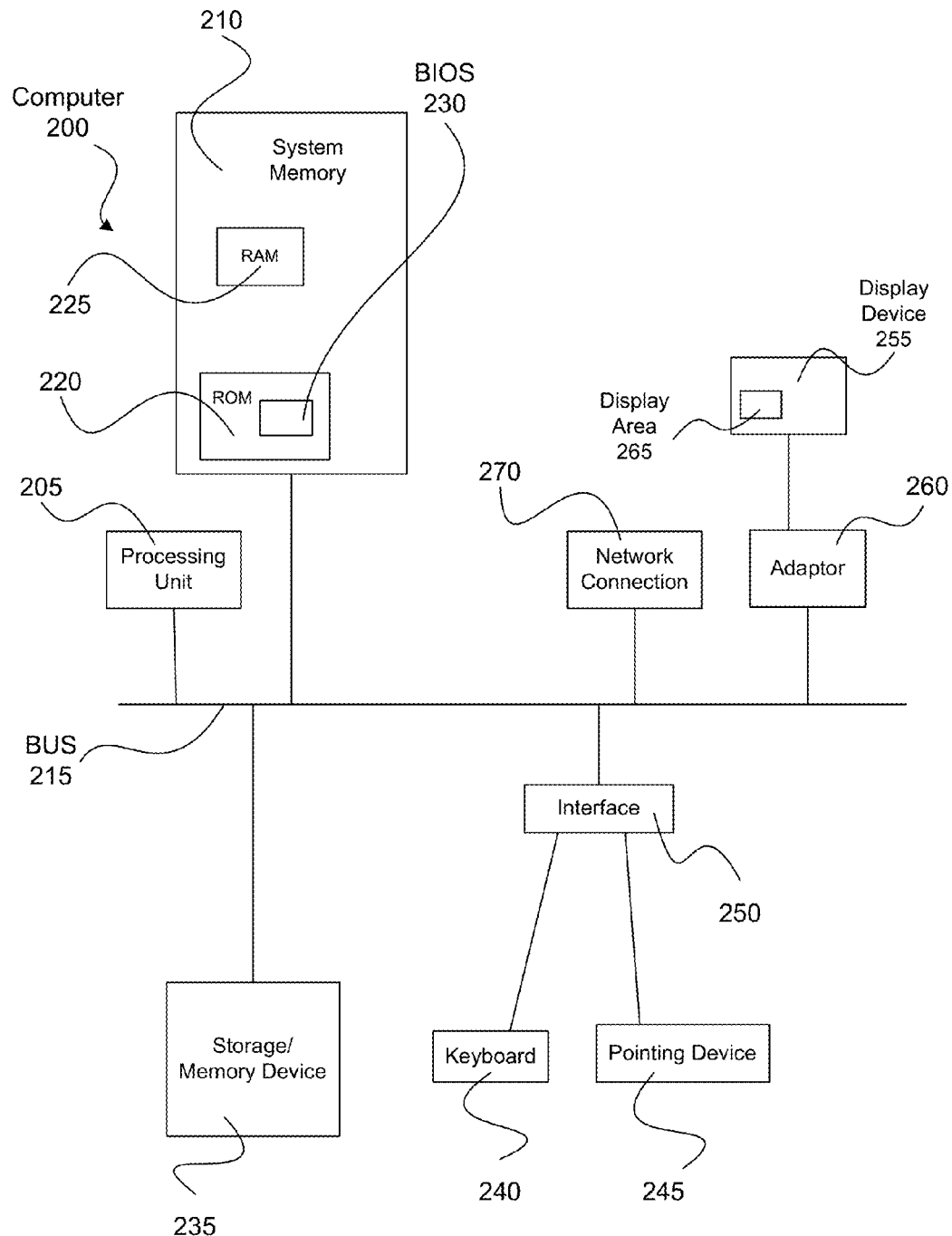
FIG. 2 illustrates one example of a computer environment that may be utilized to implement various aspects of the present disclosure.

FIG. 2 illustrates one example of a computing environment in the exemplary form of a computer 200 within which a set of instructions, for causing the computer to perform any one of the methodologies of the present disclosure, may be executed. Computer 200 may include a processing unit 205, a system memory 210, and a system bus 215 that couples various components including system memory 210 to processing unit 205. System bus 215 may be any of several types of bus structures including, but not limited to, a memory bus, a memory controller, a peripheral bus, a local bus, and any combinations thereof, using any of a variety of bus architectures. System memory 210 may include a read only memory (ROM) 220 and a random access memory (RAM) 225.

A basic input/output system 230 (BIOS), including basic routines that help to transfer information between elements within computer 200, such as during start-up, may be stored in ROM 220. Computer 200 may also include a storage/memory device 235 for reading and/or writing information. Example storage devices include, but are not limited to, a hard disk drive for reading from and/or writing to a hard disk, a magnetic disk drive for reading from and/or writing to a removable magnetic disk, an optical disk drive for reading from and/or writing to an optical media (e.g., a compact disc), and any combinations thereof. Storage/memory device 235 may be connected to bus 215 by an interface. In one example, storage/memory device 235 and associated computer-readable media provide nonvolatile storage of computer readable instructions, data structures, program modules, and/or other data for computer 200. It will be appreciated by those skilled in the art that other types of computer-readable media that can store data that is accessible by a computer in a volatile and/or non-volatile manner may also be used in an example operating environment. Examples of other types of computer-readable media include, but are not limited to, a magnetic cassette, a flash memory media (e.g., a card and a thumb-drive), a digital video disk, a Bernoulli cartridge, a random access memory (RAM), a read only memory (ROM), and any combinations thereof. A computer-readable medium, as used herein, is intended to include a single medium as well as a collection of physically separate media, such as, for example, a collection of compact disks or one or more hard disk drives in combination with a computer memory.

A number of program modules can be stored on storage/memory device 235, including, but not limited to, an operating system, one or more application programs, other program modules, program data, computer implemented instructions for carrying out the system and methodologies of the present disclosure, and any combinations thereof. A user may enter commands and information into computer 200 through one or more input devices, such as a keyboard 240 and/or a pointing device 245. Other examples of an input device include, but are not limited to a microphone, a joystick, a game pad, a satellite dish, a scanner, and any combinations thereof. These and other input devices may be connected to processing unit 205 through an interface 250 that is coupled to bus 215. Example interfaces for connecting an input device include, but are not limited to, a serial interface, a parallel interface, a game port, a universal serial bus (USB), an IEEE 1394 (Firewire) interface, a direct interface to system bus 215, and any combinations thereof.

A display device 255 may be connected to system bus 215 via an interface, such as a display generator/video adaptor 260. Example display devices include, but are not limited to, a cathode-ray tube (CRT) monitor, a plasma display, an LCD display, and any combinations thereof. In addition to a display device, a computer may include one or more other peripheral output devices, such as a speaker and a printer. A pen digitizer and an accompanying pen/stylus may be included in order to digitally capture freehand input. A pen digitizer may be separately configured or coextensive with a display area 265 of display device 255. Accordingly, a pen digitizer may be integrated with display device 255, or may exist as a separate device overlaying or otherwise appended to display device 255.

Computer 200 may include a network connection 270 for connecting to one or more of a variety of networks, such as network 120 of FIG. 1, and remote computer devices thereon. Example network connections may include, but are not limited to, a network interface card, a modem, and any combinations thereof. Example networks include, but are not limited to, a wide area network (e.g., the Internet, an enterprise network), a local area network (e.g., a network associated with an office, a building, a campus or other relatively small geographic space), a telephone network, a direct connection between two computing devices, and any combinations thereof. A network, such as network 120 may employ a wired and/or a wireless mode of communication. In general, any network topology may be used. It will be appreciated that FIG. 1 depicts only one instance of a system 100, and that other instances may be created where one or more computers utilize system 100. One or more communication protocols may be utilized with system 100 and/or with network 120. Example protocols include, but are not limited to, TCP/IP, Ethernet, FTP, HTTP, HTTPS, and any combinations thereof. In one example, a user of a computer, such as computers 110, 115 may access system 100 (e.g., on one or more server computers) utilizing a secure protocol as is well-known. A user computer, such as computers 110, 115 may utilize one or more software applications and/or one or more system based applications in communicating with system 100. Example software applications include, but are not limited to, a web browser (e.g., INTERNET EXPLORER, MOZILLA, and NETSCAPE), Java (e.g., J2ME), BREW, a direct access client (e.g., CITRIX), and any combinations thereof. Example system applications include, but are not limited to, MICROSOFT WINDOWS, UNIX, LINUX, APPLE operating system, X-WINDOWS, COCOA, POCKETPC, and PALM.

Referring to FIG. 1 an exemplary electronic message 105 is communicated by a sending user utilizing computer 110 to system 100 for further communication to a recipient user. Exemplary system 100 includes an electronic message receiver 125 for receiving one or more electronic messages, such as electronic message 105. Electronic message receiver 125 is in communication with an electronic message storage module 130. An electronic message storage module, such as electronic message storage module 130, stores electronic messages received by electronic message receiver 125 utilizing one or more particular data storage methodologies. Many data storage methodologies will be recognized by those skilled in the art and those chosen for use with an electronic message storage module according to the present disclosure may be based on the particular implementation of the messaging system and method. Example data storage methodologies may include, but are not limited to, one or more tables, a database, a file system, and any combinations thereof. In one example, as will be described in greater detail below, electronic message storage module 130 stores header ("container") information and message content separate from each other to minimize correlation by a third party between identifying information regarding the electronic message (e.g., identification of sender, recipient, date/time of message, location of message) in the header information and the content of the message. In an alternate example, message content and header information may be stored together and separated during display. In one embodiment of the present disclosure, header information and message content are never stored or displayed together. In such a case, a correlation (e.g., a non-identifying message ID described in detail below) may be utilized to associate the two components.

Electronic message 105 as communicated to system 100 in the example of FIG. 1 includes a recipient address 135 and a message content 140. A recipient address, such as recipient address 135 may be an indicator that identifies a particular desired recipient of an electronic message, such as electronic message 105. In one example, a recipient address may be a unique identifier (e.g., a screen name, a login name, a messaging name, etc.) established specifically for use with system 100 at user registration with the system. In another example, a recipient address may be a pre-established electronic mail (email) address, text messaging address, instant messaging address, Short Messaging Service (SMS) address, a telephone number (e.g., a home, work, mobile telephone number), BLACKBERRY personal identification number (PIN), or the like, that is associated with the recipient and provided by a third-party provider. Example third-party providers include, but are not limited to, a web-based commercial fee and fee-free provider (e.g., YAHOO, HOTMAIL, AMERICA ONLINE, etc.), an Internet service provider (e.g., AMERICA ONLINE, MSN, cable operator, telephone company, etc.), a telephone provider (e.g., VERIZON, CINGULAR, etc.), BLACKBERRY provider, an employer, an educational institution, and other email providers. The third-party address may be chosen by a user as their unique identifier at registration. In an alternative embodiment, a sending user may know a third-party address of an intended recipient and use it as a recipient address when generating electronic message 105. In such an embodiment, it is possible that the intended recipient is not a registered user of system 100. In one example, system 100 may optionally include an external system communication generator 145 configured to send a notification message to the third-party system associated with the recipient address used with electronic message 105. External system communication generator 145 is in communication with the appropriate network for communication with the corresponding third-party address for delivering the notification message. In one example shown in FIG. 1, external system communication generator 145 is shown connected to the Internet. In one example, a notification message may include an indication that someone has sent the desired recipient an electronic message on system 100 and that the intended recipient may register to use system 100. The notification message may include directions (e.g., a hyperlink) to a publicly available portion of system 100 for registration.

An electronic message may be any electronic file, data, and/or other information transmitted between one or more user computers. An electronic message may include (e.g., as part of a message content) any of a wide variety of information including, but not limited to, text, an image, video (e.g., single play video utilizing an application, such as MACROMEDIA FLASH), binary, tabular data (e.g., a spreadsheet), rich text including variable font color, tables, etc.), audio (e.g., single play audio utilizing an application, such as MACROMEDIA FLASH), other types of data, and any combinations thereof. In one example, a message content of an electronic message may include embedded information. In another example, a message content of an electronic message may include an attached and/or linked file. In such an example with an attached and/or linked file, the attached and/or linked file may be automatically deleted from the messaging system after being viewed by a recipient. Typically, a message content, such as message content 140 does not include information that in itself identifies the message sender, recipient, location of the electronic message, or time/date associated with the electronic message.

System 100 may optionally include a message ID generator 150. As described in further detail below, message ID generator 150 may generate a message ID for each electronic message received by system 100. The message ID is associated with the corresponding message. A message ID is used to associate a container (i.e., header) information with a corresponding separately-stored message content. In one example, a message ID may be created using a unique 128 bit, randomly generated number. System 100 may include a correlation between header information and message content in a variety of ways including, but not limited to, a database, a lookup table, an entry in a file system, and any combinations thereof. Utilizing a message ID associated with an electronic message, such as electronic message 105, system 100 may handle (e.g., store, deliver, display, etc.) a header information and a message content of a particular electronic message separately with the ability to correlate the two at a later time. Thus, a message content may be handled without any of the identifying header information. A message ID may contain unique and/or non-unique information. For example, a message ID may include a sequence number (e.g., 1, 2, 3, 4, etc.) identifying a number of a message amongst a group of messages. A sequence number may be re-used. For example, when an electronic message with a sequence number of "1" is viewed and subsequently deleted, sequence numbers for remaining electronic messages may be adjusted so that the electronic message having sequence number "2" is renumbered to number "1" and so forth. In another example, a message ID may include a sequence number and a unique user identifier (e.g., a user ID, a login ID, etc.).

System 100 may optionally include a reply ID generator 155. As described further below, reply ID generator 155 generates a reply ID for each electronic message received by system 100. The reply ID associates an electronic message, such as electronic message 105, with the sender of the electronic message. In one example, a reply ID may include no information that in itself would identify a sender of an electronic message to a third party that does not have access to the correlation maintained by the messaging system. System 100 may include a correlation between a reply ID and a corresponding message sender in a variety of ways, including, but not limited to, a database, a lookup table, an entry in a file system, and any combinations thereof. In one aspect, a reply ID associated with an electronic message allows the header information and/or the message content of the electronic message to include no information about the sender of the message that itself provides a traceable identity of the sender. As described in more detail below, a recipient may still send a reply electronic message to the original sender. Additionally, a third-party that may intercept, log, or otherwise come in possession of the header information and/or the message content will not be able to trace the electronic message to the sender without also gaining access to the correlation maintained by system 100. A reply ID may include a variety of different identifiers that allow a messaging system, such as system 100, to direct a reply electronic message back to a sender of the original electronic message. In one example, a reply ID may be created using a randomly generated number (e.g., a 128 bit, randomly generated number).

System 100 includes a display generator 160 in communication with electronic message storage module 130. Display generator 160 is configured to provide information representing a display image for display on a user computer, such as user computers 110, 115. Example display images include, but are not limited to, a user login display, a display listing information representing available electronic messages for viewing, a display for entering an electronic message, a display of a message content of an electronic message, a display for entering a reply electronic message, and any combinations thereof. In one example, display generator 160 may be configured to utilize a message ID in generating a first information 165 representing a first display image including at least some of the header information for electronic message 105. Display generator 160 may also be configured to generate a second information 170 representing a second display image including message content 140 of electronic message 105. FIG. 1 illustrates first and second information 165, 170 communicated with computer 115 for display to a recipient user. In this example, display generator 160 generates first and second information 165, 170 in a manner that does not allow the first and second display images to be displayed at the same time. Separate display of header information and message content for an electronic message reduces traceability of the electronic message. In one aspect, screenshot logging at a computer, such as computer 115, may not capture both header information and message content simultaneously. Additionally, separation of header information and message content physically and/or temporally during communication to a user computer over an open network, such as the Internet, can thwart misuse of the electronic message by reducing the ability of intercepting both components of the electronic message.

Display generator 160 may utilize any of a variety of well known display generation methodologies and/or protocols for creating information representing a displayable image. Example methodologies/protocols include, but are not limited to, hypertext markup language (HTML), extensible markup language (XML), direct graphic generation, and any combinations thereof. In one example, system 100 resides on one or more server computers and display generator 160 includes and/or utilizes a web server application to generate information representing web-browser-displayable images that may be viewed by a user computer including a web browser. In another example, display generator 160 may be configured to instruct a browser or other application of a user computer displaying a display image according to the present invention to not cache any of the information related to the display image.

System 100 may further include a deletion module 175 in communication with electronic message storage module 130. Deletion module 175 is configured to delete header information and/or message content from system 100 after a predetermined amount of time. In one example, deletion module 175 is configured to automatically delete header information and corresponding message content immediately after the message content is displayed. In another example, a deletion module (e.g., deletion module 175) is configured to automatically delete header information upon display of a corresponding message content. In yet another example, a deletion module (e.g., deletion module 175) is configured to automatically delete message content upon a display of the message content being closed. In still another example, a deletion module is configured to automatically delete header information and/or message content, whether or not they have been viewed, after a predetermined time (e.g., twenty-four hours after being received). In still yet another example, a deletion module is configured to automatically delete header information and/or message content a predetermined time (e.g., twenty-four hours) after first being displayed. In a further example, a predetermined amount of time may include a predetermined number of viewings (other than a single viewing) of a particular electronic message (e.g., an electronic message is deleted after 20 views). In still a further example, a deletion module (e.g., deletion module 175) is configured to automatically delete header information upon display of a corresponding message content and to automatically delete message content upon a display of the message content being closed. Combinations of deletion protocols, such as these examples, are also contemplated.

In an alternate embodiment, system 100 may include a display-based keyboard generator 180. Display-based keyboard generator 180 is configured to generate a display-based keyboard that may be included with a display image generated by display generator 160. A display-based keyboard can be utilized by a user (e.g., through mouse click or touch screen depression) to input information (e.g., username, password, recipient address, message content) without the use of the standard keyboard associated with the user computer. In this way interception by keyboard (keystroke) logging hardware and/or software resident on the user computer, such as computers 110, 115, can be avoided. In one example, a display-based keyboard generator may utilize FLASH technology commercially available from Macromedia Inc. In another example, a display-based keyboard generator may utilize Java technology commercially available from Sun Microsystems. In one aspect a FLASH-based keyboard may randomly place spaces between characters in the on-screen keyboard to further prevent interception of the message. Although this is a relatively slow data entry method, a user can be more assured that their information is not being logged and/or intercepted.

System 100 may also optionally include a reply message receiver 185. Reply message receiver 185 is configured to receive a reply message to one or more original electronic messages viewed by a recipient. In one aspect, a sender of an original electronic message may be determined from an identifying characteristic included, or associated, with the electronic message. Example identifying characteristics include, but are not limited to, a reply ID, an email address, a username, a display name, login ID, and any combination thereof. In one example, a reply ID of the original electronic message may be utilized in generating a reply message. In one example, a reply message as communicated by computer 115 to system 100 need only include a message content 190. System 100 may include a reply generator 195. Reply generator 195 may be configured to utilize the original reply ID to associate message content 190 and any corresponding header information with the original electronic message sending user. Message ID generator 150 may be configured to generate a message ID for the reply electronic message (i.e., message content 190 and corresponding header information). Reply ID generator 155 may be configured to generate a new reply ID for the reply message and electronic message storage module 130 may store message content 190 and corresponding header information separately for later display to the user (original sender).

Figure 3:
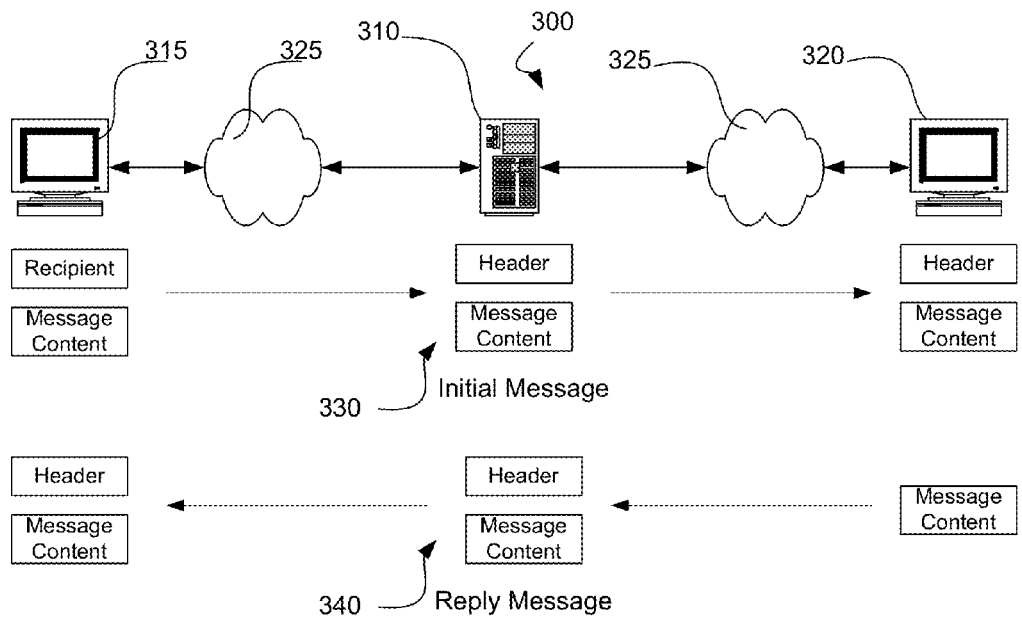
FIG. 3 illustrates another example of a schematic diagram of another exemplary system and method of the present disclosure.
Figure 4:
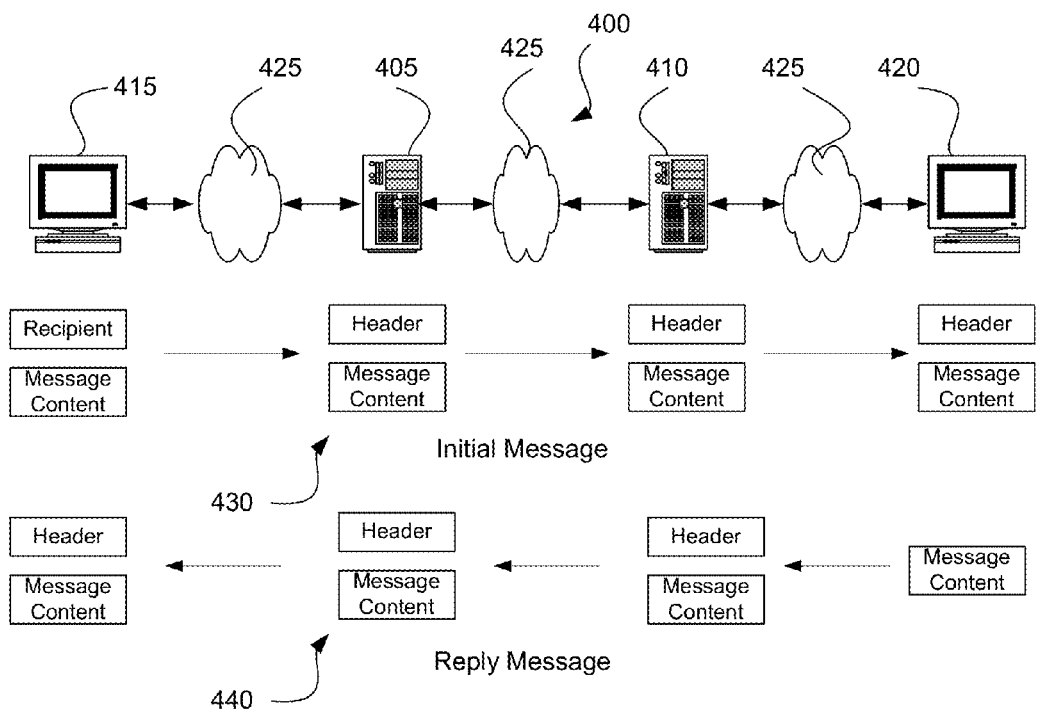
FIG. 4 illustrates another example of a schematic diagram of another exemplary system and method of the present disclosure.

FIG. 1 illustrates only an exemplary embodiment of a messaging system and networking environment according to the present disclosure. As will be appreciated by those skilled in the art and as described herein, variations to system 100 and the network environment may be utilized in implementing the various aspects and methodologies of the present disclosure. FIGS. 3 and 4 illustrate alternate computing environments. FIG. 3 illustrates one embodiment of a messaging system 300 according to the present disclosure. System 300 includes a computing environment having a single server computer 310. User computers 315 and 320 communicate with server computer 310 via network 325. An electronic message 330 is communicated utilizing system 300. A reply electronic message 340 is also illustrated. FIG. 4 illustrates another embodiment of a messaging system 400 according to the present disclosure. System 400 includes a computing environment having two server computers 405, 410. User computers 415 and 420 communicate with server computers 405, 410 via network 425. An electronic message 430 is communicated utilizing system 400. A reply electronic message 440 is also illustrated. Server computers 405, 410 together perform the functionality of the single server computer 310 of FIG. 3.

Figure 5:
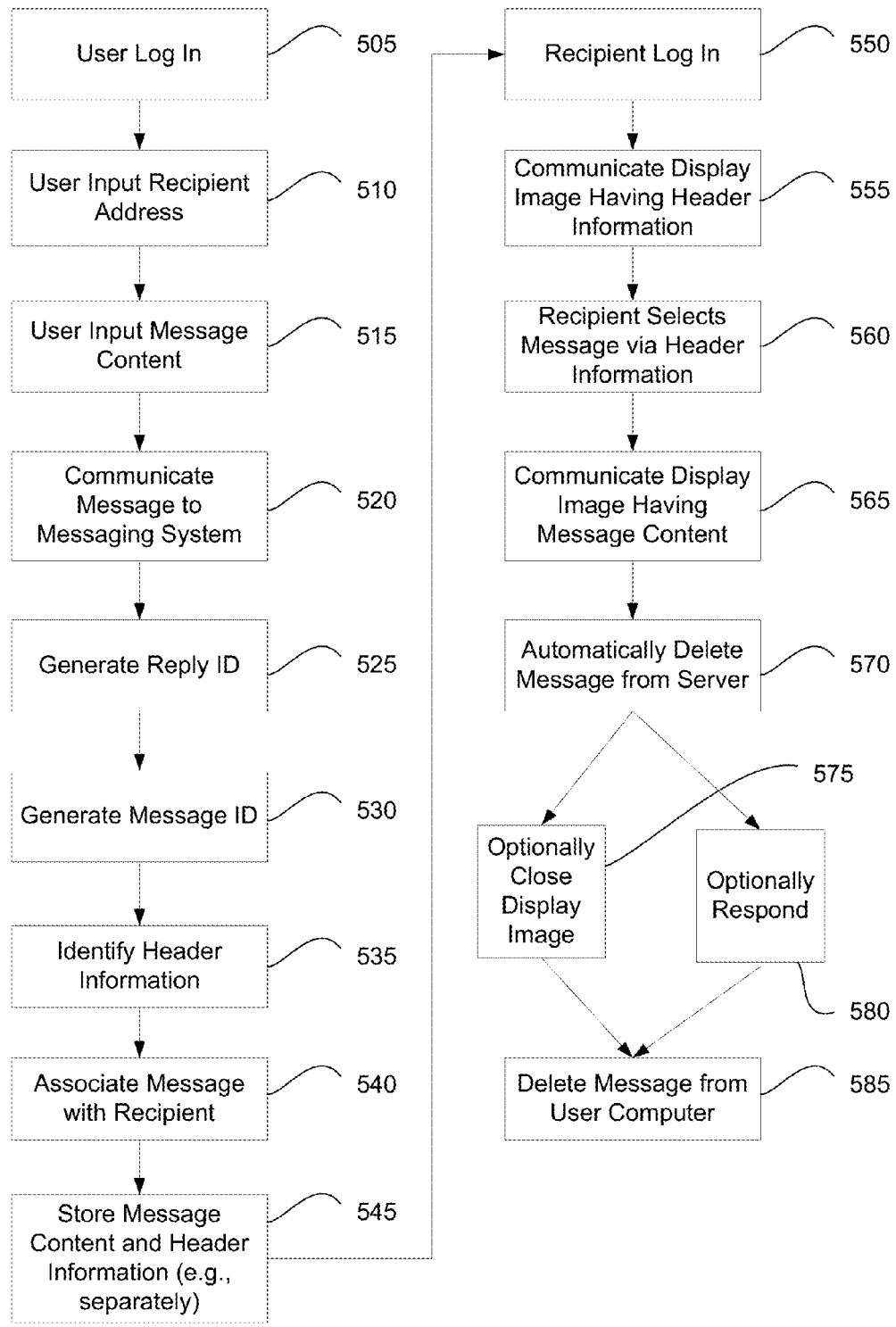
FIG. 5 illustrates one example of a flow chart depicting one exemplary method according to the present disclosure.
Figure 7:
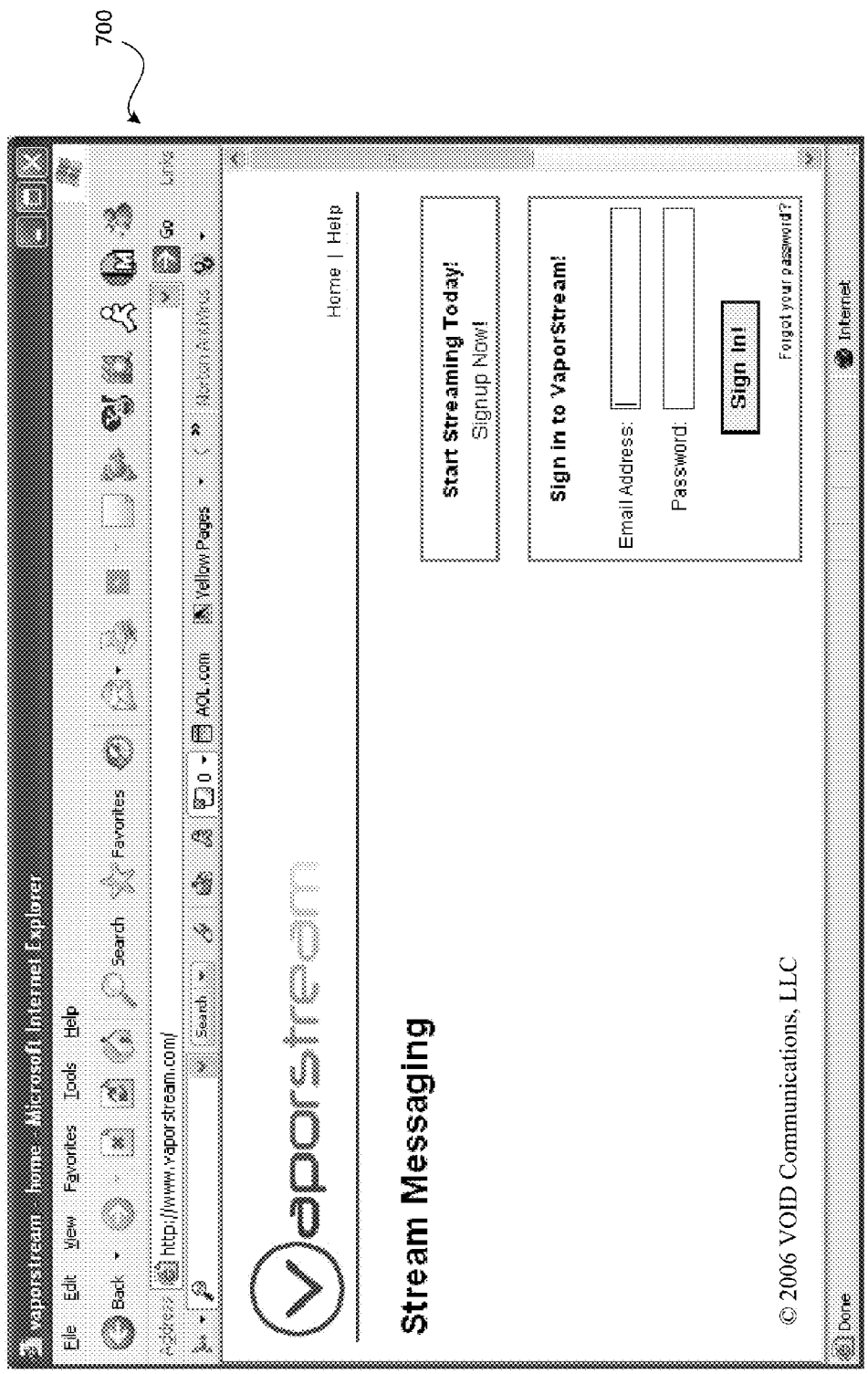
FIG. 7 depicts an exemplary login display image.

Referring to FIGS. 3 and 5, an exemplary operation of a messaging system according to the present disclosure, such as system 300, can be described. A user may log into system 300 at computer 315 (step 505 of FIG. 5). For example, a user may access a web site or other networked interface associated with server 310. Server 310 may then provide information representing a display image (e.g., a web page) for display on computer 315 that allows the user to log into the system. In one aspect, a user of system 300 may have associated therewith a login ID and password for logging into system 300. FIG. 7 depicts an example login display 700 that may be used. In one aspect, system 300 may provide an instruction to a browser or other application on computer 315, or other computer viewing a display image according to the present disclosure, to not cache the information contained in the display image. Upon entry of a valid login ID and password, server 310 establishes a communications link with computer 315 (e.g., a key infrastructure, secure sockets layer (SSL), secure HTTP (HTTPS) or other secure or non-secure communications link). In one example, system 300 may utilize an email address as a login ID.

In one aspect, while a user is logged into system 300, a session may be established including the establishment of a session ID. A session and a corresponding memory may be utilized by system 300 to maintain certain information regarding the session and the user (e.g., user's identification information, a reply ID).

Figure 8:
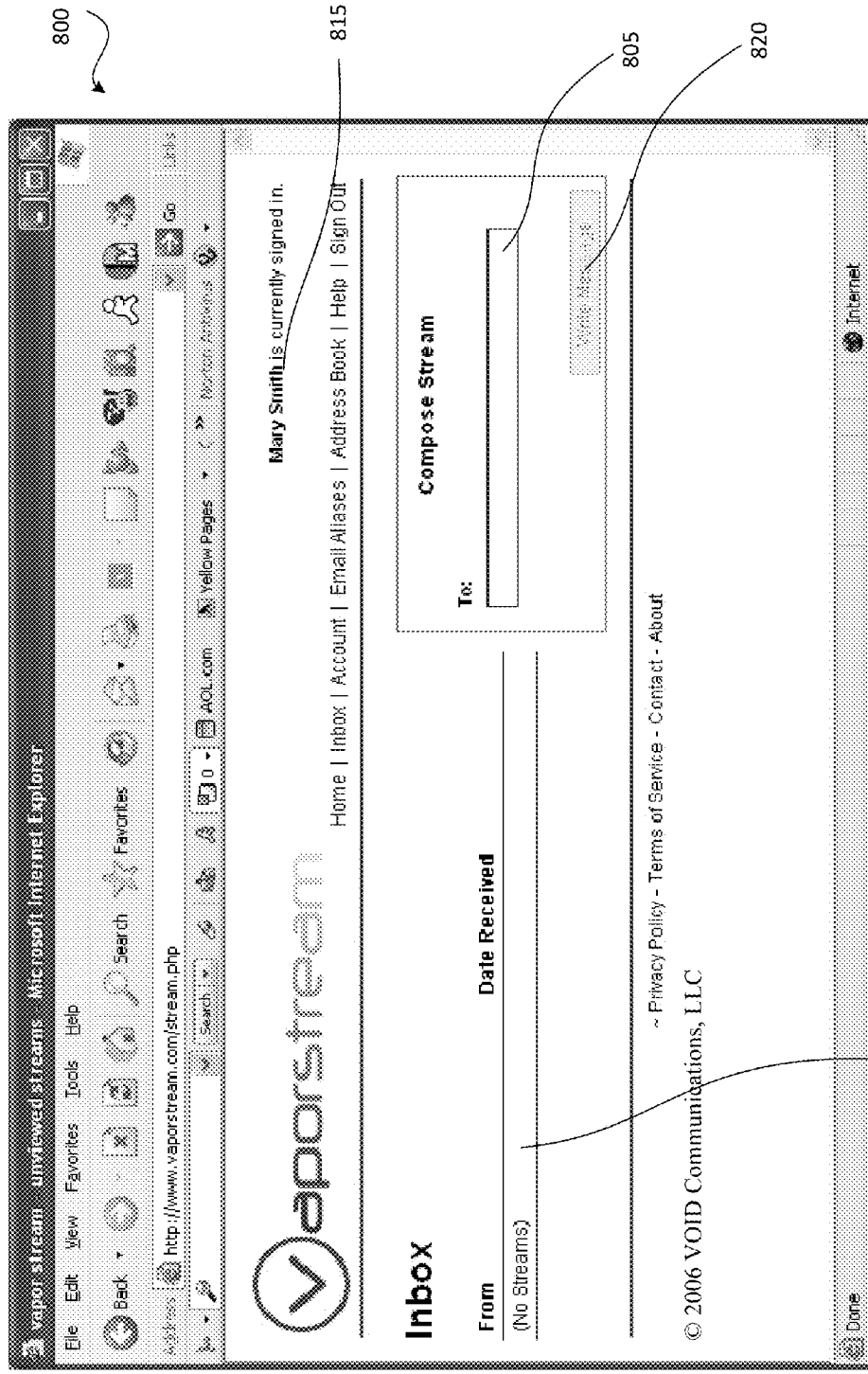
FIG. 8 depicts an exemplary display image including a recipient address input portion.

Upon proper login, the user may be presented with a session starting display image. One of skill in the art will appreciate that a variety of starting display images (i.e., pages) may be available for display to a user upon initial login to system 300. In one example, a display image for inputting an electronic message may be displayed. FIG. 8 illustrates one example of a starting display image 800. Display image 800 includes a first portion 805 for entering a recipient address or other identifier for one or more recipients of a message. Display image 800 also illustrates an "inbox" portion 810 for listing unread electronic messages on the system for the logged in user. In this example, an optional display name 815, "Mary Smith" for the logged in user is displayed. A display name may be the same or different from a corresponding login name and/or user address, and may or may not include identifying information regarding the user.

Figure 9:
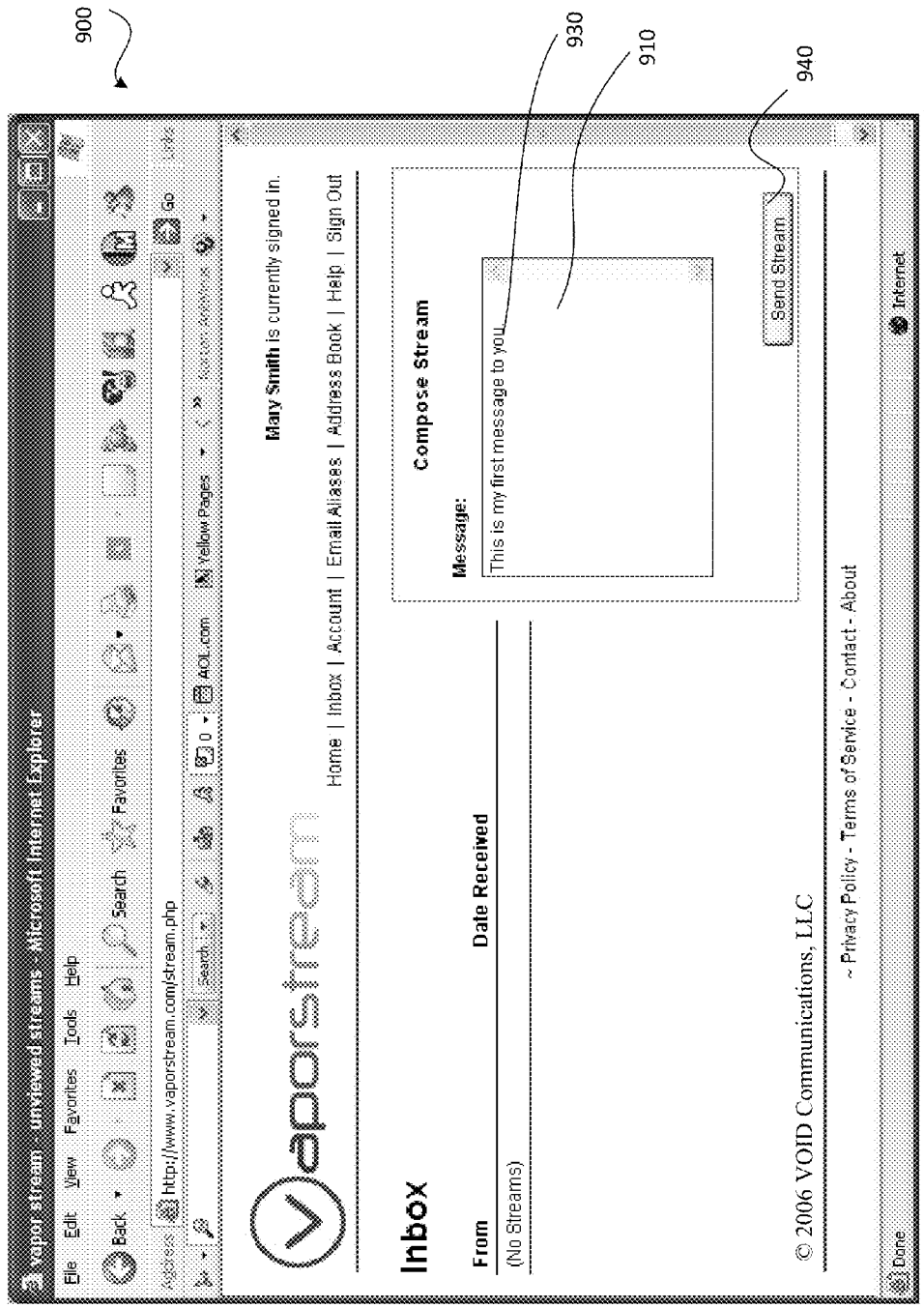
FIG. 9 depicts an exemplary display image including an electronic message content input portion.

Upon entering a recipient address (step 510 of FIG. 5) and activating a button 820 or other trigger, a message content display screen, such as message content display screen 900 of FIG. 9 may be displayed. Display screen 900 includes a first portion 910 for inputting (step 515 of FIG. 5) a message content corresponding to the recipient address input at portion 805 of FIG. 8. In this example, the recipient address and the message content are entered on separate display screens. In another example, the recipient address and message content may be input on a single display image screen. Separation of the entry of the recipient address and message content further reduces the traceability of an electronic message by, in part, reducing the ability of logging at computer 315.

In an alternative embodiment, a display-based keyboard (as discussed above) may be included in an electronic message input displays, such as display images 700, 800, and 900. A user may use a mouse or other pointing device (e.g., a touchscreen display) to select characters being entered.

FIG. 9 illustrates an example message content 930 having been entered in portion 910. Upon completion of message content entry, a user may select button 940, or other indicator, to communicate message content 930 to server 310 (step 520 of FIG. 5). In one example, the recipient address may be communicated to server 310 separately from a corresponding message content at the time of entry. This may reduce the ability to intercept the entire electronic message during communication to server 310. In another example, the recipient address may be retained at computer 315 until the entry of corresponding message content in a subsequent display image. In one example, upon communication of the recipient address and message content 930, computer 315 retains no trace of the either the recipient address or message content 930. For example, each may exist only in random access memory (RAM), and possibly in virtual memory (e.g., a page file) established in a disk drive, at computer 315 from the time the user types the information until the loading of the next display image at computer 315, after which the information is effectively deleted. Referring to FIG. 3, electronic message 330 is illustrated as including a recipient address and message content that is communicated from computer 315 to server 310.

In an alternate embodiment, upon server 310 receiving electronic message 330, instructions associated with system 300 (e.g., instruction stored at server 310) generates a reply ID and associates the reply ID with electronic message 330 (step 525 of FIG. 5). Server 310 maintains a correspondence between the reply ID and the sending user. In one example, a new reply ID is created for each electronic message regardless of whether the sending user is the same as another electronic message. This enhances the reduced traceability of the electronic message.

In another alternate embodiment, at step 530, system 300 generates a message ID for associating the separated message content and header information of electronic message 330. Server 310 maintains a correspondence between the message content and header information.

At step 535, header information associated with electronic message 330 is identified for separation from message content 930. In one aspect, separation of information that identifies the sending user, recipient user, location of the electronic message, timing of electronic message from the message content may be implemented by associating such information with a container or header information component of the electronic message. In one example, utilization of a reply ID and a message ID can further facilitate the removal of information that itself identifies a sending user or recipient. A display name for the sending user may be generated and associated with the header information. The display name for the user need not be unique, thus maintaining the anonymity of the user when electronic message 330 is ultimately communicated to computer 320 or otherwise viewed by the recipient. In one example, system 300 replaces all information associated with electronic message 330 that could itself identify the sending user. In one embodiment, a predetermined display name for the sending user that does not provide unique identification of the sending user may be generated and associated with corresponding header information. In another example, system 300 may utilize a display name that includes information that uniquely identifies the sending user (e.g., login name, email address, etc.).

In one example, header information for a particular electronic message, such as header information, may include, but is not limited to, a reply ID, a message ID, a date/time associated with the electronic message (e.g., date/time of creation, date/time of delivery, etc.), a display name representing a sender of the electronic message, and any combinations thereof.

At step 540, an electronic message 330 is associated with a recipient represented by the recipient address. In one example, a location of the recipient is determined. As used herein, a location may include a message mailbox, a message server associated with the recipient, a computer associated with the recipient, an electronic address of the recipient, a display name for the recipient in system 300, or the like. For example, system 300 may identify a user by a variety of identities (e.g., display name, login ID, associated email address, text messaging address, instant messaging address, SMS address, mobile number, BLACKBERRY PIN, or the like) to determine a routing for electronic message 330. As discussed above, if the recipient is not a registered user of system 300, a notification may be sent to a third-party system of the existence of electronic message 330. For example, if the recipient is identified by a third-party email address, a notification may go to the email recipient over the third-party email network. Similarly, if the recipient is identified by a Blackberry PIN, a notification may go to the recipient over the Blackberry network.

At step 545, header information and message content are stored. In one example, header information and message content are stored separately from each other (e.g., in separate files, in separate databases, in separate tables, etc.). A message ID may be used to maintain a correspondence between the separated components of electronic message 330. Storage may occur in a variety of ways including, but not limited to, storage at a location of the recipient and storage at server 310. In one example, the header information and message content of electronic message 330 are stored in a storage medium of server 310 in separate tables.

In another example, each user of system 310 is assigned a storage directory (e.g., on a server, on a user computer such as in a peer-to-peer arrangement, etc.). Upon association of a user with the recipient address, the message content and header information for any electronic messages to that user may be stored in that user's storage directory. The following XML file definition illustrates an example of header information for two electronic messages stored in a user storage directory.

```
<?xml version="1.0" encoding="UTF-8" ?>
<streams>
<streamsummary id="8C515D3B6A3A99C6C1A1F1DE019C7AB0"
    from="user one" datereceived="1143660969"
    replyid="6C04279318E53F61A9D7984ADD4C3E1A" />
<streamsummary id="98F78AD49BFC35B36357850C107460DF" from=
"user four
    [mike.smith@onlinemail.com]" datereceived="1143665437"
    replyid="0648B99BE6F9E5AB21F3A163AD242173" />
</streams>
```

The above file definition includes a message ID ("streamsummary id"), a display name ("from"), date received, and reply ID for each message in the recipients storage directory. Note that as an implementation variation, the sending user of the second message has associated therewith a display name, "user four", which includes a reference to an email address, mike.smith@onlinemail.com. This email address may or may not be associated with an actual email account of a third-party system, and may or may not provide actual identifying information related to the sending user. The following message content XML file is stored separately in the storage directory from the above header information.

```
<?xml version="1.0" encoding="UTF-8" ?>
<message id="8C515D3B6A3A99C6C1A1F1DE019C7AB0" " subject="">
<text>This is my first message to you.</text>
</message>
```

The following second message content XML file is stored separately in the storage directory from the header information.

```
<?xml version="1.0" encoding="UTF-8" ?>
<message id="98F78AD49BFC35B36357850C107460DF" subject="">
<text>This is a reply message to your message from Monday.</text>
</message>
```

Each of the message content XML files includes the corresponding message ID for correlation back to the corresponding header information. Each message content XML file also includes the message content. One skilled in the art would recognize other storage methodologies for separating header information from message content that are consistent with the present disclosure.

Figure 10:
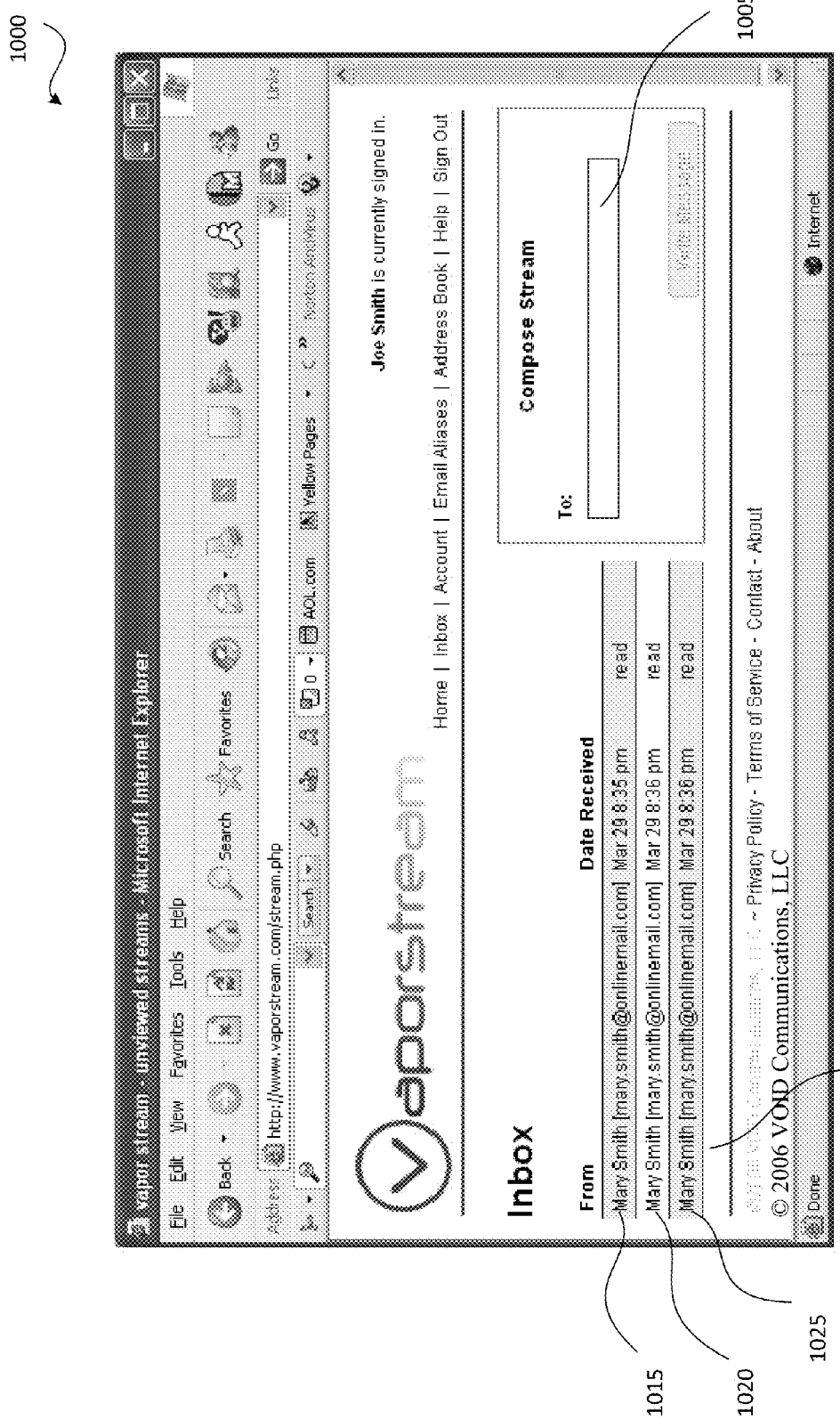
FIG. 10 depicts an exemplary display image including an electronic message listing portion.

Referring again generally to FIG. 5 at step 550 to describe the retrieval of an electronic message by a user, a recipient user logs into system 300 using computer 320. A display image similar to that in FIG. 7 may be utilized as a login display. In one example, upon entry of a valid login ID and password, a communication link between computer 320 and server 310 is established. At step 555 of FIG. 5, a display image having header information is communicated (e.g., from server 310 to computer 320. System 300 provides a display image to computer 320 representing at least some of the header information associated with any electronic messages associated with the recipient user. FIG. 10 illustrates an example display image 1000 including a recipient address input portion 1005 and a message listing portion 1010. Message listing portion 1010 includes a list of header information 1015, 1020, 1025 of three electronic messages. Message listing portion 1010 includes a display name and a date/time received for each of header information 1015, 1020, 1025. Each message container (or header information) 1015, 1020, 1025 may also include an association to a message ID and an association to a reply ID (although, not displayed in display image 1000). Message content for each electronic message is not displayed via display image 1000.

FIG. 3 illustrates header information and a message content for electronic message 330 being communicated to computer 320. In this example, header information 1015 represents electronic message 330.

In an alternate embodiment, the header information communicated to computer 320 may include a sequence number (ex: 1, 2, 3, etc.) assigned to each electronic message associated with a particular user and/or sent to a particular computer. In such an embodiment, each sequence number may be associated in system 300 with the corresponding message ID. The message ID may be removed from the corresponding header information and/or message content. In this manner, system 300 may avoid sending a message ID to a user computer and instead may send the sequence number, which may be reused when a message is deleted and is, therefore, less traceable from the user computer.

At step 560, a user may select one of the electronic messages indicated by header information 1015, 1020, 1025 (e.g., by selecting a corresponding "read" indicator in message listing 1010). At the time of selection, the message content for each electronic message may not have been communicated to computer 320. In one example, message content may be communicated to computer 320 along with corresponding header information (but, not displayed). In another example, message content may be retained at server 310 until a second request from a user is sent to server 310 to view a message content of a particular electronic message. In such an example, computer 320 requests a message content for a selected electronic message (e.g., electronic message 330 via header information 1015) from server 310. In response to this action, server 310 may associate a message ID from the selected header information and communicate the message content having the corresponding message ID to computer 320. Alternatively, where a sequence number is utilized for each electronic message, server 310 associates the sequence number of the selected electronic message with a corresponding message content and communicates the message content to computer 320.

Figure 11:
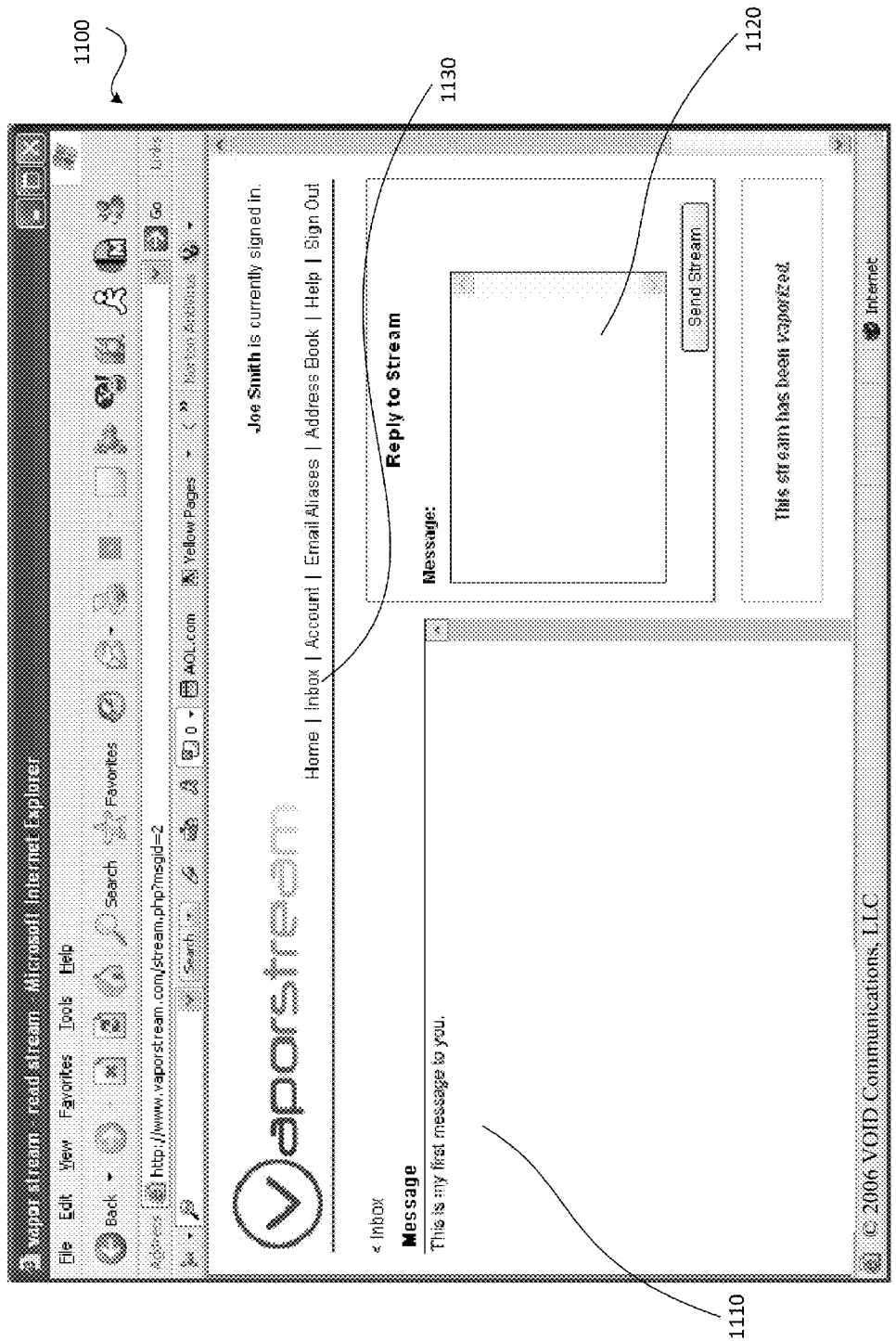
FIG. 11 depicts an exemplary display image including a reply message input portion.

At step 565, a display image including the message content, but none of the header information, is provided at computer 320. FIG. 11 illustrates one example display image 1100 presenting message content, independent of header information, for electronic message 330 upon the selection of header information 1015 in display image 1000 of FIG. 10. Display image 1100 includes a message content portion 1110 including the message content of electronic message 330. Display image 1100 also includes a reply message input portion 1120.

In one alternate embodiment, display image 1100 may employ FLASH technology to display the message content. For example, display image 1100 may require the user to "park" the on-screen cursor in an area in display image 1100 to see the message content, which may be displayed as a Flash movie. Should the cursor be moved, the displayed message content will be hidden from view on the screen to allow the user to quickly prevent the message content from being seen by onlookers. Also, this technology may also be utilized to prevent the message content from being printed using the web browser or application print because the message content will be hidden as soon as the user moves the mouse in attempt to print. In another example, the use of Cascading Style Sheets (CSS) may allow the portion of the display image including the message content to be not shown or hidden during printing.

Referring to FIG. 5, at step 570, the electronic message, such as electronic message 330, is automatically permanently deleted from server 310 at a predetermined time at step 565. In one example, header information is deleted from server 310 upon its communication to computer 320, and then the corresponding message content is deleted from server 310 upon its communication to computer 320. In such an example, once message list 1010 is displayed to a user, the user must view the message content during that session. To achieve the ability to view one message content and return to message list 1010, the header information for non-viewed electronic messages may be retained in memory at computer 320. In another example, header information is retained at server 310 until the corresponding message content is viewed, at which point both the header information and the message content is deleted from server 310. A reply ID for a particular electronic message may be retained in memory of server 310 (e.g., in response to a request for viewing a message content, server 310 may associate a current session ID with the reply ID) until the display image that displays the corresponding message content is closed by the user. This will allow a user to utilize reply message portion 1120 of display image 1100 to reply to the current message content without having to have a unique address for the original sender associated with the message content on computer 320. FIG. 3 illustrates a server-based system. Deletion from an alternate system, such as a peer-to-peer system, may include deletion of an electronic message from storage at a user computer.

As discussed above, other examples of deletion times for deletion from a system, such as system 300, include, but are not limited to, automatic deletion of header information and corresponding message content immediately after the message content is displayed, automatic deletion of header information upon display of a corresponding message content, automatic deletion of message content upon a display of the message content being closed, automatic deletion of header information and/or message content (whether or not they have been viewed) after a predetermined time (e.g., twenty-four hours after being received), automatic deletion of header information and/or message content a predetermined time (e.g., twenty-four hours) after first being displayed, and any combinations thereof. In one example, system 300 is configured to require a given deletion scheme (e.g., automatic permanent deletion of an electronic message upon displaying the electronic message and/or one or more of its components) regardless of a desire of a sending and/or recipient user.

One example of a deletion algorithm appropriate for deletion of electronic messages from system 300 include, but is not limited to, US Department of Defense (DoD) clearing and sanitizing standard DoD 5220.22-M. In an alternative embodiment, server computer 310 may delete an electronic message, such as electronic message 330 and the corresponding reply ID from its own memory if the recipient fails to retrieve the electronic message within a predetermined amount of time.

In one example, after viewing the message content, the user may select a link 1130 on display image 1100 to return to the message listing (e.g., message listing 1010 of FIG. 10), or otherwise close the display image (step 575 of FIG. 5). In another example, after viewing the message content, the user may choose to respond to electronic message (step 580 of FIG. 5), as will be described in further detail hereinafter. If the user fails to respond to the message content within a predetermined amount of time (e.g., 1 hour) an associated reply ID may be deleted from server 310. If the user chooses to return to the listing of messages, the message content may be automatically deleted from the recipient's computer 320 after viewing (step 585 of FIG. 5). For example, the message content will exist only in RAM, and possibly in virtual memory established in the disk drive, in computer 320 from the time the user views the message content until the loading of the next screen into computer 320, after which the message is effectively deleted. Furthermore, in one example, the listing of messages (e.g., message listing 1010 of FIG. 10), will no longer include the header information for a particular electronic message (e.g., header information 1015 of electronic message 330) that has been deleted from server 310, and the session ID will no longer include reference to the reply ID. In other words, the user will not be able to view that message again or reply to the message once it has been deleted. For example, FIG. 12 illustrates message list 1010 after electronic message 330 has been deleted from server 310 and computer 320.

In an alternative embodiment, electronic messages may be sent, stored, and/or retrieved using encryption technology. Various encryption technologies are known to those skilled in the art. For example, a combination of public and private encryption keys may be utilized by users and the system to further ensure security and reduce traceability of electronic messages until deletion.

Figure 6:
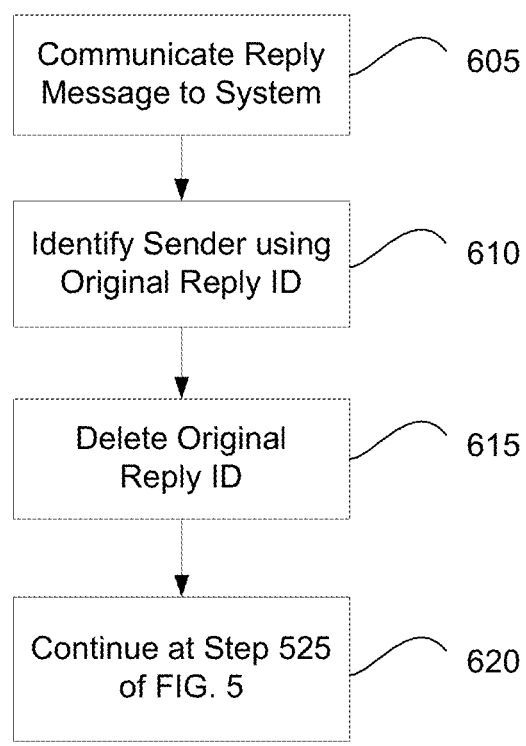
FIG. 6 illustrates another example of a flow chart depicting another exemplary method according to the present disclosure.

Referring to FIGS. 3 and 6, operation of system 310 in optionally sending a reply message 340 from user computer 320 to user computer 315 can be described. As shown for example in FIG. 11, the recipient user of the original electronic message (e.g., electronic message 330) may choose to reply to the message utilizing reply message input portion 1120. Reply message input portion 1120 allows a user to input a message content for a reply message. In this example, there is no need to input a recipient address as an original reply ID may be utilized by system 300 in determining the routing of the reply electronic message. After the user completes reply message input portion 1120, he or she may select the "send stream" button 1140. In response, computer 320 communicates the reply message content to server computer 310 (step 605 of FIG. 6). After the reply message content is communicated, computer 320 retains no trace of the message's existence. For example, the message will exist only in RAM, and possibly in virtual memory established in the disk drive, in computer 320 from the time the user types the message until the loading of the next screen into computer 320, after which the message is effectively deleted. In an alternative embodiment, a display-based keyboard, as discussed above, may be utilized as part of display image 1100 for inputting reply message content.

In one example, upon receipt of the reply message content, server 310 determines the reply ID for the original message (e.g., from the current session ID), and uses the reply ID to associate the electronic message with the user that sent the original message 330 (step 610 of FIG. 6). This may be accomplished in a variety of ways including, but not limited to, a lookup table, a database, or the like, which provides a correlation between the reply ID and the sender of the initial message. At step 615, system 300 then deletes the initial reply ID (e.g., the reply ID for message 330) from server 310's memory. In an alternate embodiment, the identity of the sender of an original electronic message may be determined from another identifier associated with the electronic message (e.g., display name, login ID, associated email address, text messaging address, instant messaging address, SMS address, mobile number, BLACKBERRY PIN, or the like).

Next at step 620, the server 310 may generate another reply ID and associate the reply ID with reply message 340 in a similar fashion as discussed above for electronic message 330. Server 310 may also generate another message ID, which establishes a correlation between the message content of reply message 340 and header information for reply message 340. Header information and message content for reply message 340 are handled and stored similarly as described above with respect to electronic message 330. Reply message 340 may be viewed by its recipient in the same manner as original electronic message 330 was viewed.

Advantageously, the system 300 allows the users of the computers 315 and 320 to have a private conversation over network 325. After messages, such as electronic message 330 and reply message 340, are communicated the sender leaves no proof of the message on his or her computer. In one example, after the recipient views the message (or at another predetermined time), the message no longer exists on system 300, thus ensuring that the message cannot be forensically recreated and ensuring that there is no record of the message remaining on system 300. In another example, no copies of an electronic message are ever delivered to a user computer. In such an example, only non-caching display images of header information and message content are displayed separately. The header information and message content may be immediately, automatically, and permanently deleted from the system upon display. Once each display image is closed, the information is gone forever. Thus, in this example, there is never a copy on the user computer to be archived, forwarded, copied, pasted, etc. In another aspect, separate display of header information and message content prevents a single screen capture at a user computer from creating a complete record of the electronic message. In yet another aspect, a system and method according to the present disclosure may provide an end-to-end recordless electronic messaging system that upon the deletion of the electronic message leaves no trace of the message content, header information, or the fact that it was created, existed, delivered, viewed, etc.

FIG. 4 is a schematic diagram depicting a system 400 having an alternative network topology. The embodiment of FIG. 4 is substantially similar to that of FIG. 3, except that system 400 of FIG. 4 employs two message servers 405 and 410 operably coupled to user computers 415 and 420 by one or more networks 425. In the embodiment of FIG. 4, the two message servers 415 and 420 together perform the tasks previously described for the single message server 310 of FIG. 3. For example, in the method for sending the initial message 330, message server 405 may perform steps 505 to 535 and a portion of step 540 of FIG. 5, while message server 410 acts as the "recipient location" and performs a portion of step 540 and steps 545 to 585 of FIG. 5. It will be appreciated that both servers 405 and 410 may keep track of the reply ID and both servers 405 and 410 delete the message after it has been passed along. This arrangement is particularly useful where message servers 405 and 410 are each associated with a different enterprise, business organization, LAN, or the like.

It is to be noted that the above described aspects and embodiments may be conveniently implemented using a conventional general purpose computer programmed according to the teachings of the present specification, as will be apparent to those skilled in the computer art. Appropriate software coding can readily be prepared by skilled programmers based on the teachings of the present disclosure, as will be apparent to those skilled in the software art.

Such software can be a computer program product which employs a storage medium including stored computer code which is used to program a computer to perform the disclosed function and process of the present invention. The storage medium may include, but is not limited to, any type of conventional floppy disks, optical disks, CD-ROMs, magneto-optical disks, ROMs, RAMs, EPROMs, EEPROMs, magnetic or optical cards, or any other suitable media for storing electronic instructions.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A computer-implemented method of handling an electronic message at a sending user device in a networked environment, the electronic message including a header information and a message content, the sending user device having access to electronic instructions, the electronic instructions being stored at the sending user device and/or at a server computer, the method comprising:

associating a message content including a media component with the electronic message via a first display at a sending user device;

associating an identifier of a recipient with the electronic message via a second display at the sending user device, the first and second displays being generated by the electronic instructions such that the first and second displays are not displayed at the same time via the sending user device, the identifier of a recipient being part of a header information for the electronic message, the electronic instructions acting on the displays at the sending user device such that the header information is not displayed with the media component via the first display preventing a single screen capture of both the identifier of a recipient and the media component;

transmitting the message content including a media component from the sending user device to a server computer; and transmitting the identifier of a recipient from the sending user device to the server computer, said transmitting the message content including a media component and said transmitting the identifier of a recipient occurring separately, the identifier of a recipient and the message content including a media component each including a correlation to allow the identifier of a recipient and the message content including a media component to be related to each other at a later time by the server computer.

2. A computer-implemented method according to claim 1, wherein the media component is not displayed via the second display with the identifier of a recipient.

3. A computer-implemented method according to claim 1, wherein the media component is no longer on the sending user device after said transmitting the message content and the recipient address.

4. A computer-implemented method according to claim 1, further comprising deleting the message content including a media component and a header information including the identifier of a recipient from the sending user device upon said transmitting the media component to the server computer.

5. A computer-implemented method according to claim 1, further comprising causing the message content including a media component to not be accessible by a sending user for display upon the first display being closed.

6. A computer-implemented method according to claim 1, wherein the sending user device is a device selected from the group consisting of a personal computer, a workstation computer, a server computer, a laptop computer, a handheld device, a mobile telephone, a personal digital assistant, and any combinations thereof.

7. A computer-implemented method according to claim 1, wherein the media component includes information selected from the group consisting of an image, video, audio, and any combinations thereof.

8. A computer-implemented method according to claim 1, wherein the media component includes an image.

9. A computer-implemented method according to claim 1, wherein the message content including a media component does not include information about the sender of the electronic message that itself provides a traceable identity of the sender.

10. A computer-implemented method according to claim 1, wherein the message content including a media component does not include information that in itself identifies a user sending the electronic message, a recipient user of the electronic message, or a date associated with the electronic message.

11. A computer-implemented method according to claim 1, further comprising receiving message content information in addition to the media component via a display-based keyboard.

12. A machine readable hardware storage medium containing machine executable instructions implementing a method of handling an electronic message at a sending user device in a networked environment, the electronic message including a header information and a message content, the instructions comprising:

a set of instructions for associating a message content including a media component with the electronic message via a first display at a sending user device;

a set of instructions for associating an identifier of a recipient with the electronic message via a second display at the sending user device, the identifier of a recipient being part of a header information for the electronic message;

a set of instructions for generating the first display;

a set of instructions for generating the second display, the set of instructions for generating the first display and the set of instructions for generating the second display including instructions such that the first and second displays are not displayed at the same time via the sending user device, the set of instructions for generating the first display acting on the first display such that the header information is not displayed with the media component via the first display preventing a single screen capture of both the identifier of a recipient and the media component;

a set of instructions for transmitting the message content including a media component from the sending user device to a server computer; and a set of instructions for transmitting the identifier of a recipient from the sending user device to the server computer, said transmitting the message content including a media component and said transmitting the identifier of a recipient occurring separately, the identifier of a recipient and the message content including a media component each including a correlation to allow the identifier of a recipient and the message content including a media component to be related to each other at a later time by the server computer.

13. A machine readable hardware storage medium according to claim 12, wherein the media component is no longer on the sending user device after said transmitting the message content and the recipient address.

14. A machine readable hardware storage medium according to claim 12, further comprising a set of instructions for deleting the message content including a media component and a header information including the identifier of a recipient from the sending user device upon said transmitting the media component to the server computer.

15. A machine readable hardware storage medium according to claim 12, further comprising a set of instructions for causing the message content including a media component to not be accessible by a sending user for display upon the first display being closed.

16. A machine readable hardware storage medium according to claim 12, wherein the message content including a media component does not include information about the sender of the electronic message that itself provides a traceable identity of the sender.

17. A machine readable hardware storage medium according to claim 12, further comprising a set of instructions for receiving message content information in addition to the media component via a display-based keyboard.

18. A machine readable hardware storage medium according to claim 12, wherein the sending user device is a device selected from the group consisting of a personal computer, a workstation computer, a server computer, a laptop computer, a handheld device, a mobile telephone, a personal digital assistant, and any combinations thereof.

19. A machine readable hardware storage medium according to claim 12, wherein the media component includes information selected from the group consisting of an image, video, audio, and any combinations thereof.

20. A machine readable hardware storage medium according to claim 12, wherein the media component includes an image.

21. A machine readable hardware storage medium according to claim 12, wherein the message content including a media component does not include information that in itself identifies a user sending the electronic message, a recipient user of the electronic message, or a date associated with the electronic message.

22. A machine readable hardware storage medium according to claim 12, wherein the media component is not displayed via the second display with the identifier of a recipient.

23. A system for handling an electronic message at a sending user device in a networked environment, the electronic message including a header information and a message content, the system comprising:
   a means for associating a message content including a media component with the electronic message via a first display at a sending user device;
   a means for associating an identifier of a recipient with the electronic message via a second display at the sending user device, the identifier of a recipient being part of a header information for the electronic message;
   means for generating the first display;
   means for generating the second display, the set of instructions for generating the first display and the set of instructions for generating the second display including instructions such that the first and second displays are not displayed at the same time via the sending user device; the means for generating the first display acting on the first display such that the header information is not displayed with the media component via the first display preventing a single screen capture of both the identifier of a recipient and the media component;
   a means for transmitting the message content including a media component from the sending user device to a server computer; and
   a means for transmitting the identifier of a recipient from the sending user device to the server computer, said transmitting the message content including a media component and said transmitting the identifier of a recipient occurring separately, the identifier of a recipient and the message content including a media component each including a correlation to allow the identifier of a recipient and the message content including a media component to be related to each other at a later time by the server computer.

24. A system for handling an electronic message according to claim 23, wherein the media component is not displayed via the second display with the identifier of a recipient.

25. A system for handling an electronic message according to claim 23, wherein the media component is no longer on the sending user device after said transmitting the message content and the recipient address.

26. A system for handling an electronic message according to claim 23, further comprising a means for deleting the message content including a media component and a header information including the identifier of a recipient from the sending user device upon said transmitting the media component to the server computer.

27. A system for handling an electronic message according to claim 23, further comprising a means for causing the message content including a media component to not be accessible by a sending user for display upon the first display being closed.

28. A system for handling an electronic message according to claim 23, wherein the sending user device is a device selected from the group consisting of a personal computer, a workstation computer, a server computer, a laptop computer, a handheld device, a mobile telephone, a personal digital assistant, and any combinations thereof.

29. A system for handling an electronic message according to claim 23, wherein the media component includes information selected from the group consisting of an image, video, audio, and any combinations thereof.

30. A system for handling an electronic message according to claim 23, wherein the media component includes an image.

31. A system for handling an electronic message according to claim 23, wherein the message content including a media component does not include information about the sender of the electronic message that itself provides a traceable identity of the sender.

32. A system for handling an electronic message according to claim 23, wherein the message content including a media component does not include information that in itself identifies a user sending the electronic message, a recipient user of the electronic message, or a date associated with the electronic message.

33. A system for handling an electronic message according to claim 23, further comprising a means for receiving message content information in addition to the media component via a display-based keyboard.

* * * * *